(12) United States Patent
Vielhaber

(10) Patent No.: US 9,850,078 B2
(45) Date of Patent: Dec. 26, 2017

(54) METHOD AND INSTALLATION FOR THE DEPOSITION OF PROFILED RODS

(71) Applicant: ASMAG-Holding GmbH, Gruenau im Almtal (AT)

(72) Inventor: Johann Vielhaber, Gruenau im Almtal (AT)

(73) Assignee: ASMAG-Holding GmbH, Gruenau im Almtal (AT)

( * ) Notice: Subject to any disclaimer, the term of this patent is extended or adjusted under 35 U.S.C. 154(b) by 0 days.

(21) Appl. No.: 15/115,957

(22) PCT Filed: Feb. 3, 2015

(86) PCT No.: PCT/AT2015/050038
§ 371 (c)(1),
(2) Date: Aug. 9, 2016

(87) PCT Pub. No.: WO2015/113098
PCT Pub. Date: Aug. 6, 2015

(65) Prior Publication Data
US 2017/0144846 A1  May 25, 2017

(30) Foreign Application Priority Data
Feb. 3, 2014   (AT) .............. A 50075/2014

(51) Int. Cl.
*B21B 39/00*   (2006.01)
*B65G 57/18*   (2006.01)
*B65G 57/03*   (2006.01)

(52) U.S. Cl.
CPC .......... *B65G 57/035* (2013.01); *B21B 39/002* (2013.01); *B65G 57/18* (2013.01); *B65G 57/186* (2013.01); *B65G 2201/0217* (2013.01)

(58) Field of Classification Search
CPC .... B65G 57/186; B65G 57/18; B65G 57/035; B65G 2201/0276; B65G 2201/0217; B21F 3/02; Y10S 414/103
See application file for complete search history.

(56) References Cited

U.S. PATENT DOCUMENTS 3,880,296 A * 4/1975 Kaplan ................ B65G 57/183
                                                        198/409
4,043,459 A * 8/1977 Moreau .................. B65G 57/03
                                                        414/789.5
(Continued)

FOREIGN PATENT DOCUMENTS

BE        655451 A      3/1965
DE     24 01 175 A1     7/1975
(Continued)

OTHER PUBLICATIONS

International Search Report of PCT/AT2015/050038, dated Jun. 2, 2015.

*Primary Examiner* — Gregory Adams
(74) *Attorney, Agent, or Firm* — Collard & Roe, P.C.

(57) ABSTRACT

The invention relates to a method for an oriented deposition of hexagonal profiled rods (2) with their longitudinal edges (5) pointing downward in the direction of a stacking table (9) in a stacking installation (1). In doing so, an initial number of n-profiled rods (2) is provided on a feed table (8) and a stacking shaft (11) is built with the corresponding width (14). Then, several first transfer arms (17) are adjusted as protruding over the stacking shaft (11) on the side facing away from the feed table (8) and the profiled rods (2) are placed by means of a transfer device (10) on the support surfaces (18) arranged on the transfer arms (17) as well as are held by the transfer device (10) lying adjacent to one another. The transfer arms (17) are re-adjusted and, in doing so, the first profiled rod (2) is placed in the guide areas (21)

(Continued)

Figure 4:
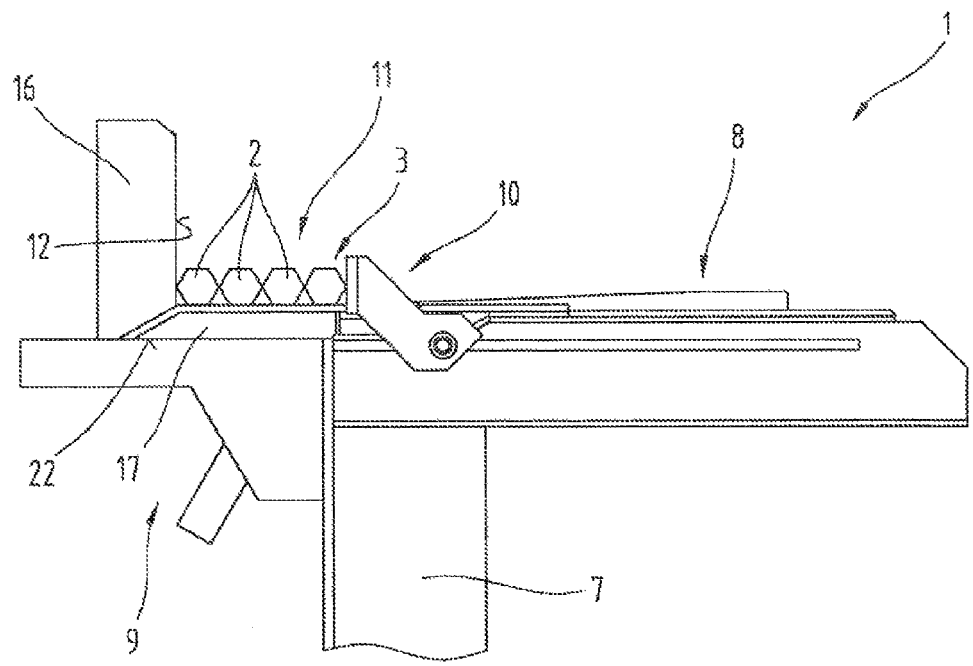

aligned sloping on the transfer arms (17) as well as swiveled along its longitudinal axis. In case of further adjustment of the transfer arms (17), the first profiled rod (2) is lowered on the stacking shaft bottom (15) guided at the first stacking shaft walls (12) as well as the guide areas (21). The further profiled rods (2) are similarly swiveled and are lowed on the stacking shaft bottom (15) always adjacent to one another. The invention also related to an installation for an oriented deposition of profiled rods (2).

14 Claims, 12 Drawing Sheets

(56) References Cited

U.S. PATENT DOCUMENTS

| | | | | |
|---|---|---|---|---|
| 4,201,506 A | * | 5/1980 | Rysti | B65G 57/18 |
| | | | | 414/791.6 |
| 5,222,859 A | | 6/1993 | Gepfert et al. | |
| 7,621,712 B2 | * | 11/2009 | Simmons | B65G 57/005 |
| | | | | 198/370.1 |
| 7,651,314 B2 | * | 1/2010 | Hogue | B65G 57/035 |
| | | | | 414/791.6 |
| 7,695,240 B2 | * | 4/2010 | Ghosh | B65G 57/183 |
| | | | | 198/403 |
| 8,613,585 B2 | * | 12/2013 | Johansson | B65G 57/18 |
| | | | | 414/794.1 |
| 8,721,254 B1 | * | 5/2014 | Kuhns | B65G 57/28 |
| | | | | 414/789.2 |
| 8,857,599 B2 | | 10/2014 | Poloni et al. | |
| 2003/0031550 A1 | | 2/2003 | Dube et al. | |

FOREIGN PATENT DOCUMENTS

| | | |
|---|---|---|
| EP | 2 314 530 A2 | 4/2011 |
| JP | S56-151628 A | 11/1981 |
| JP | S57-77122 A | 5/1982 |
| JP | S63-180625 A | 7/1988 |
| JP | H01-167019 A | 6/1989 |
| JP | H09-175655 A | 7/1997 |
| JP | 2002-167044 A | 6/2002 |
| SU | 1 150 195 A1 | 4/1985 |
| WO | 2011/141570 A1 | 11/2011 |

* cited by examiner

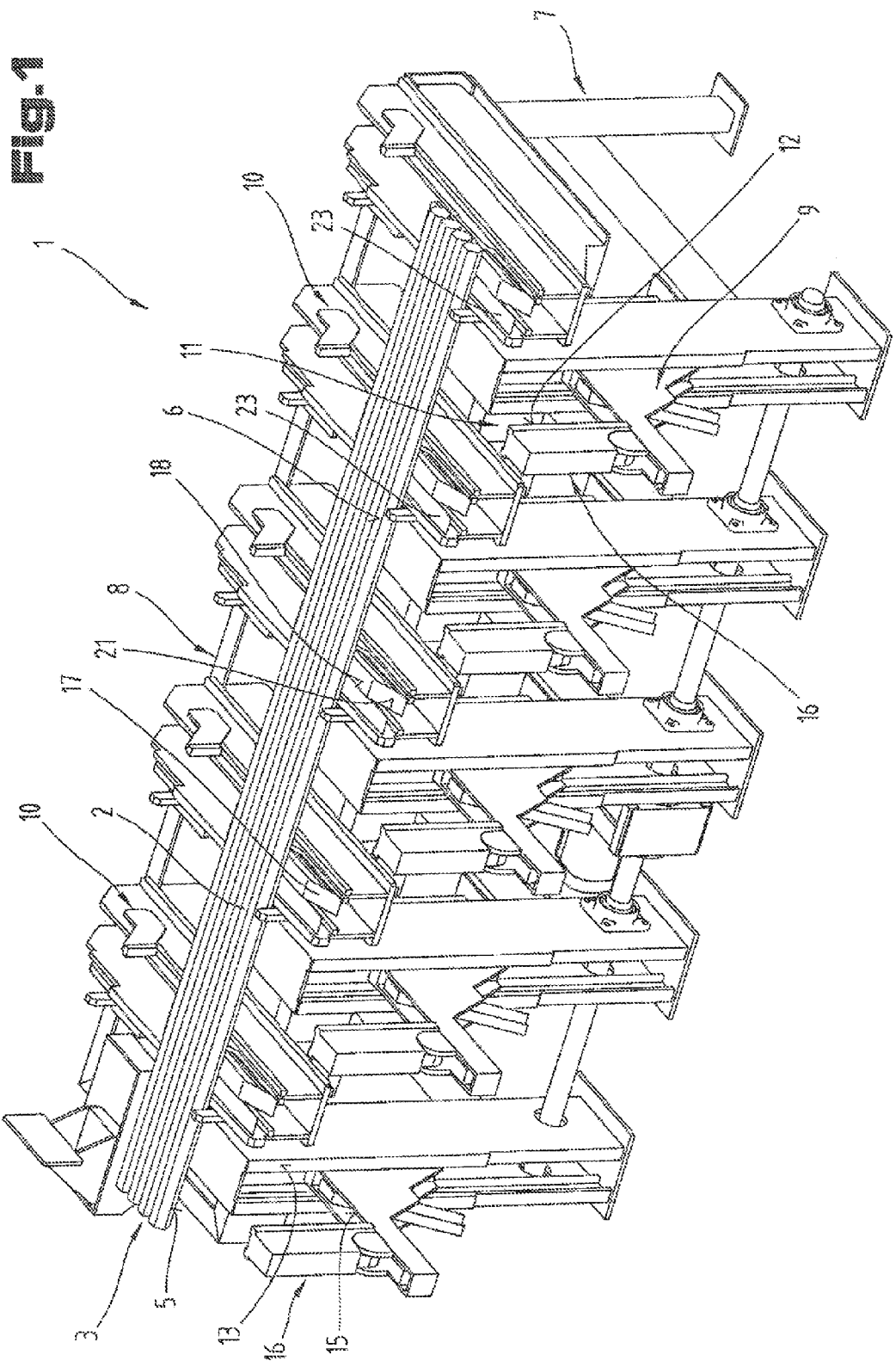

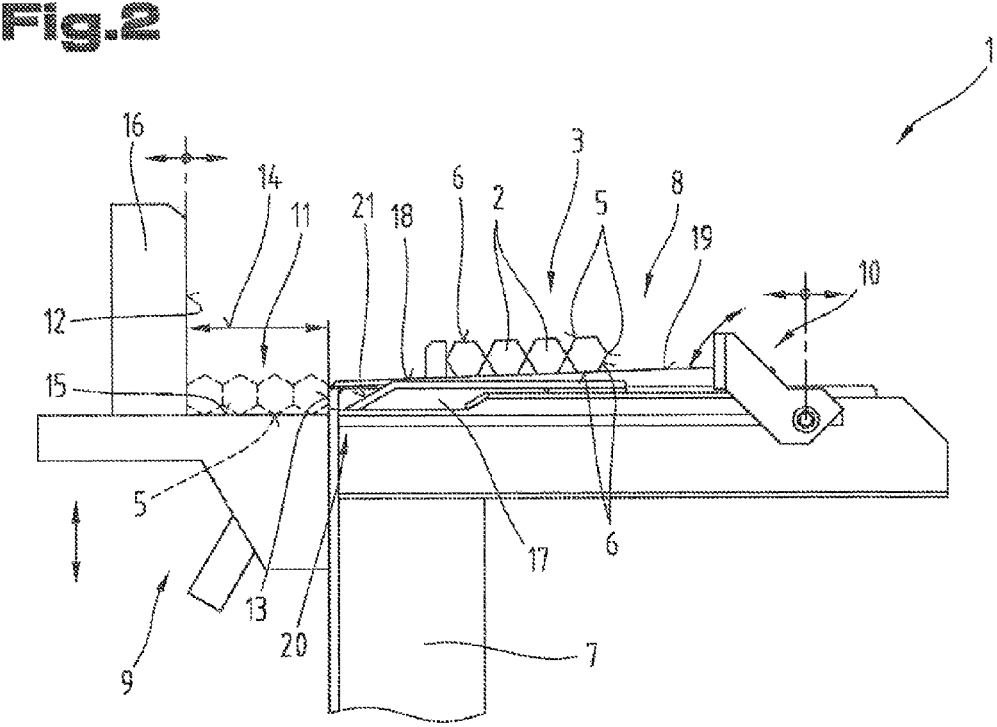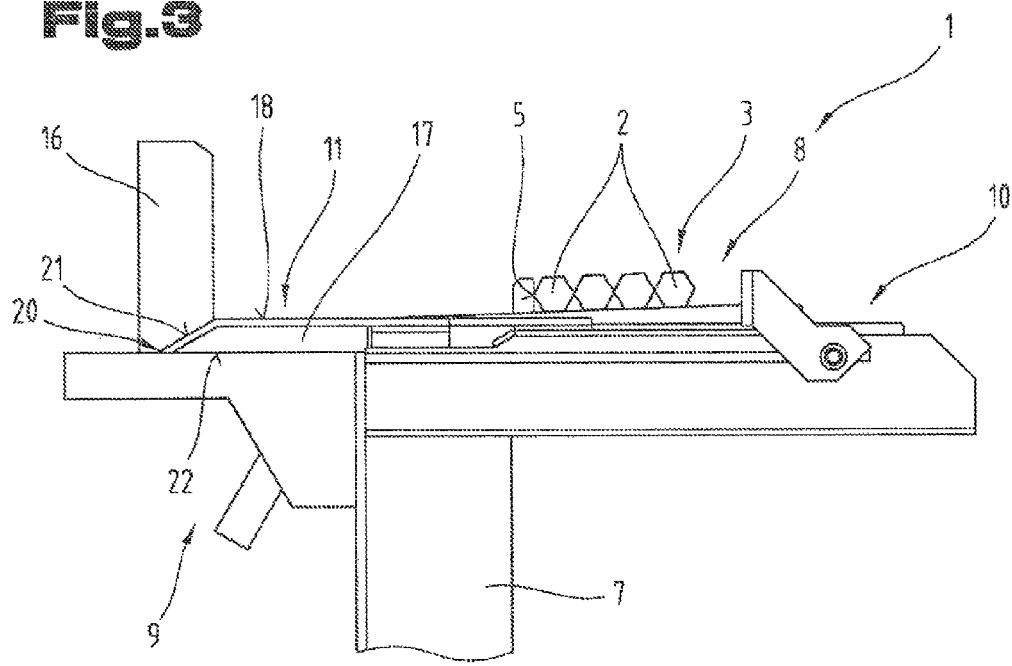

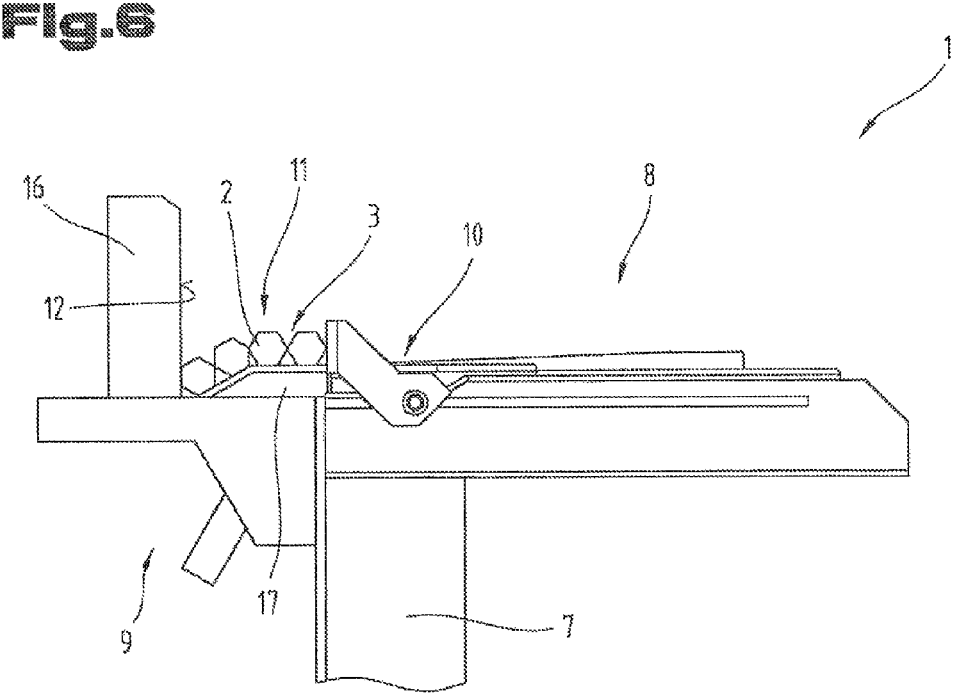
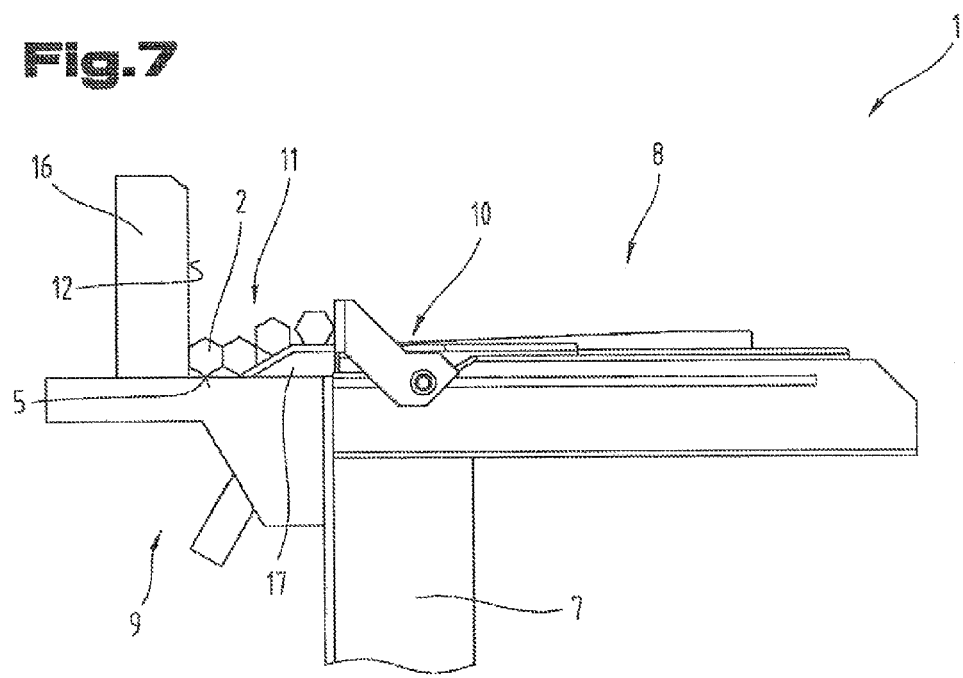

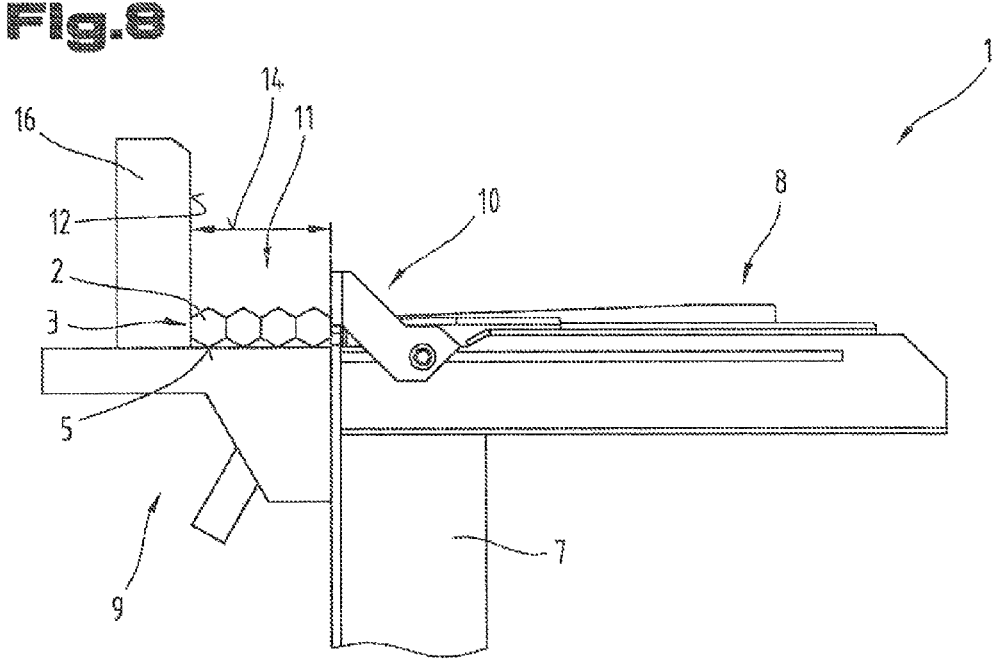
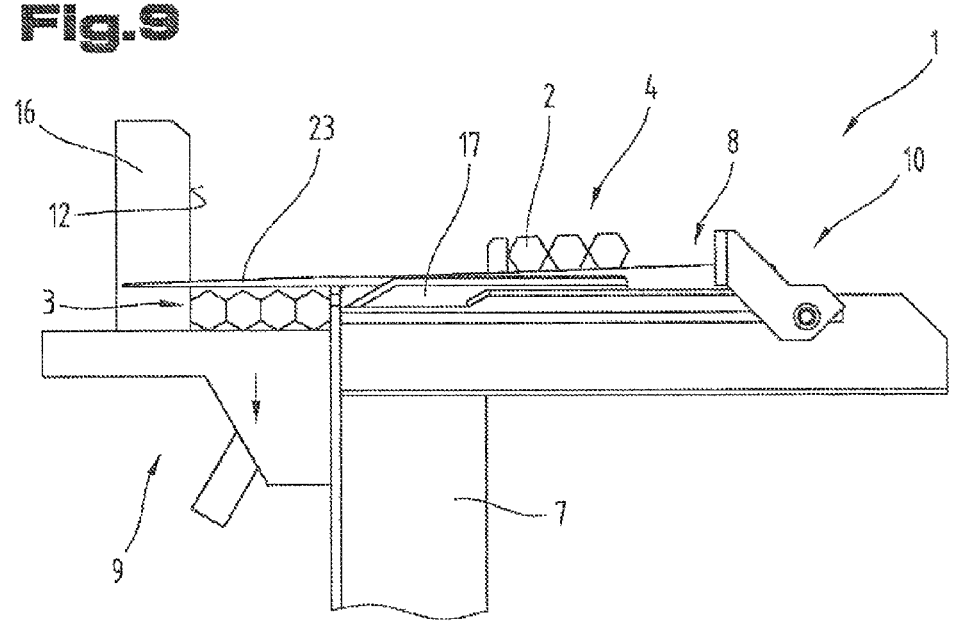

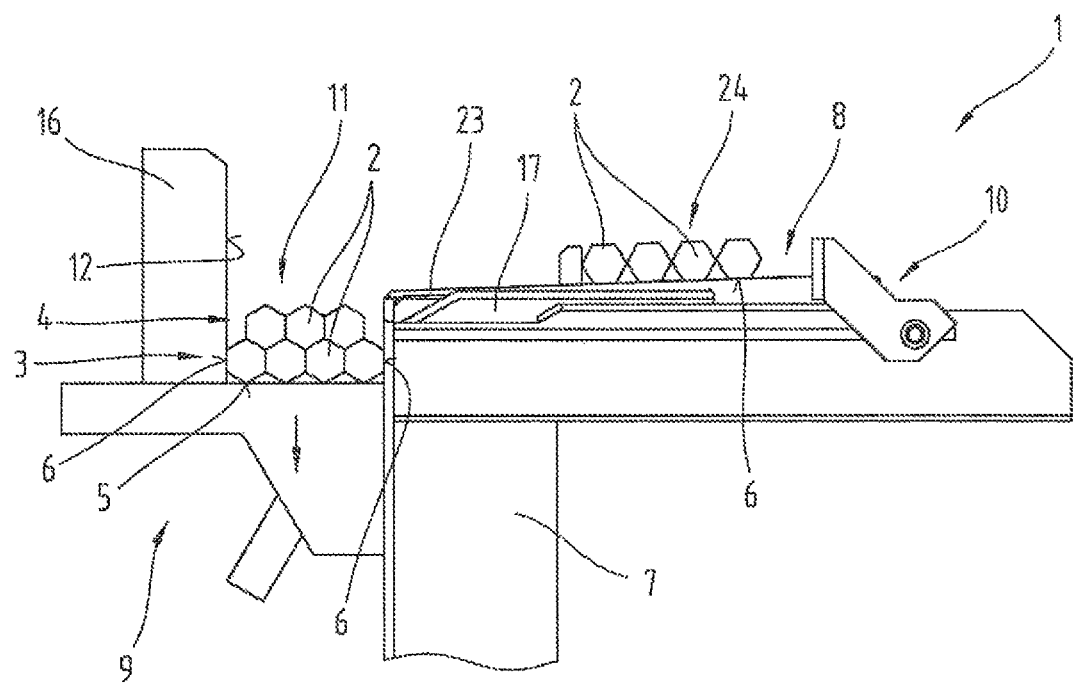

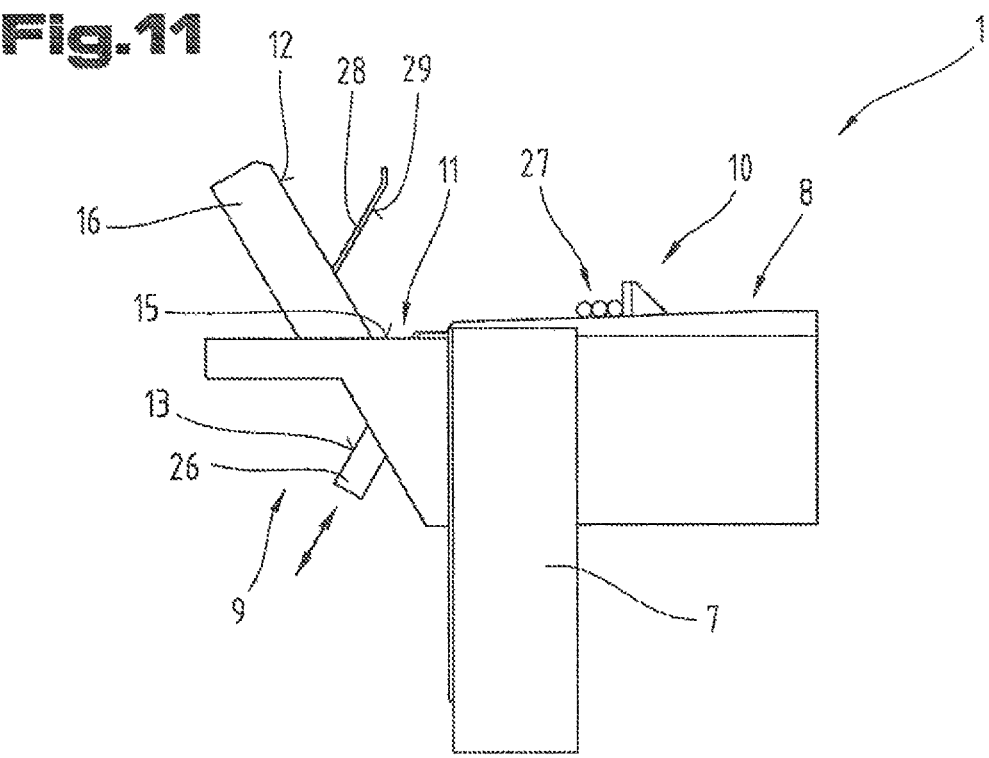
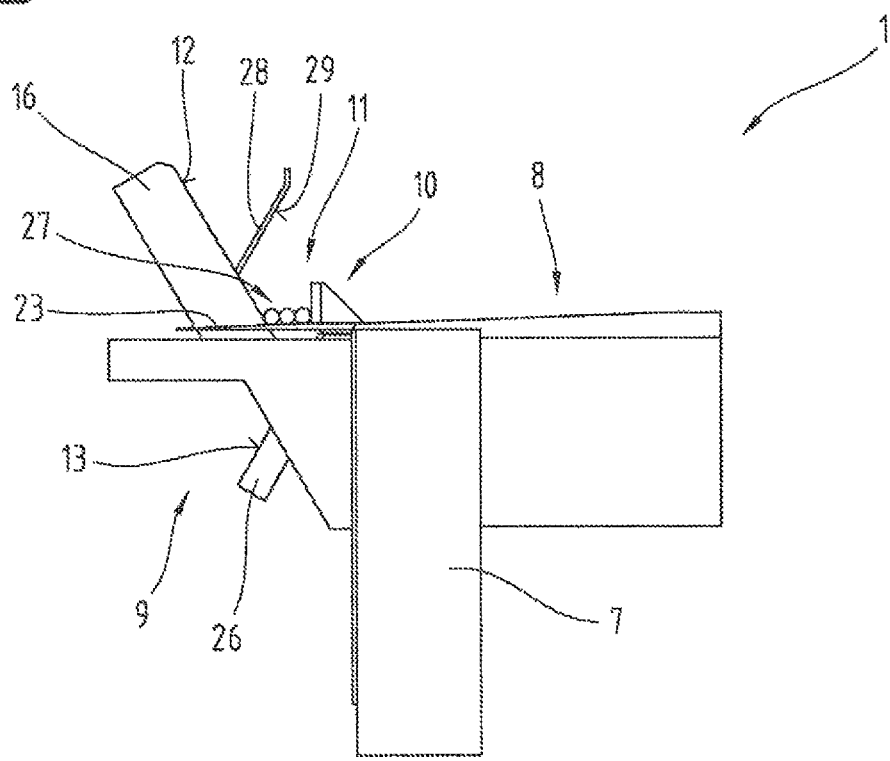

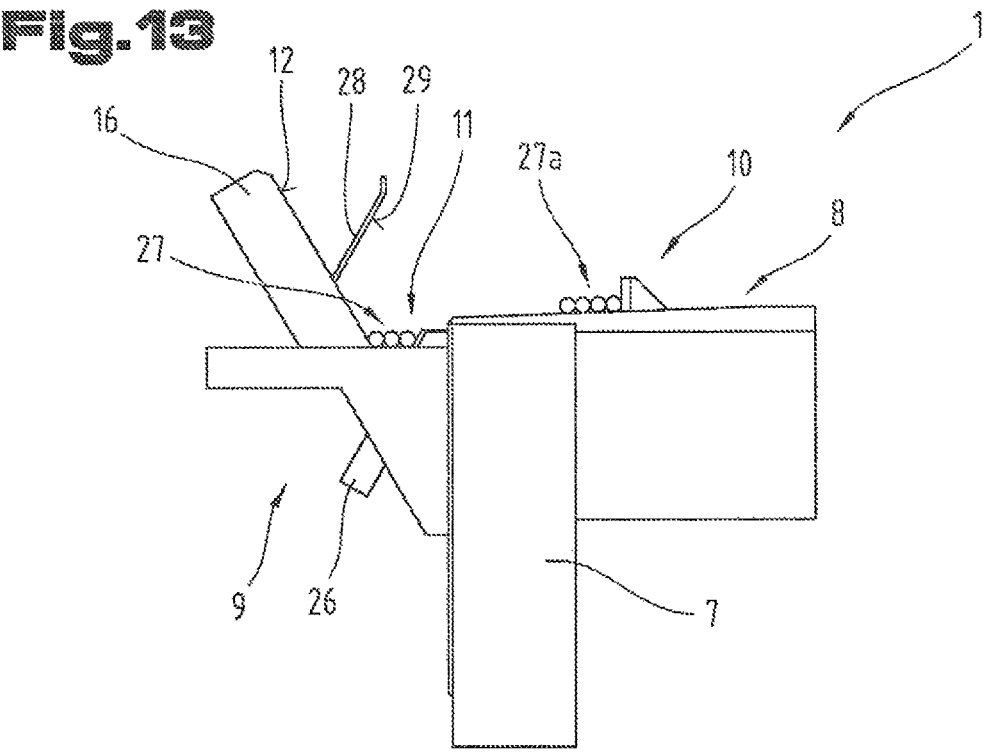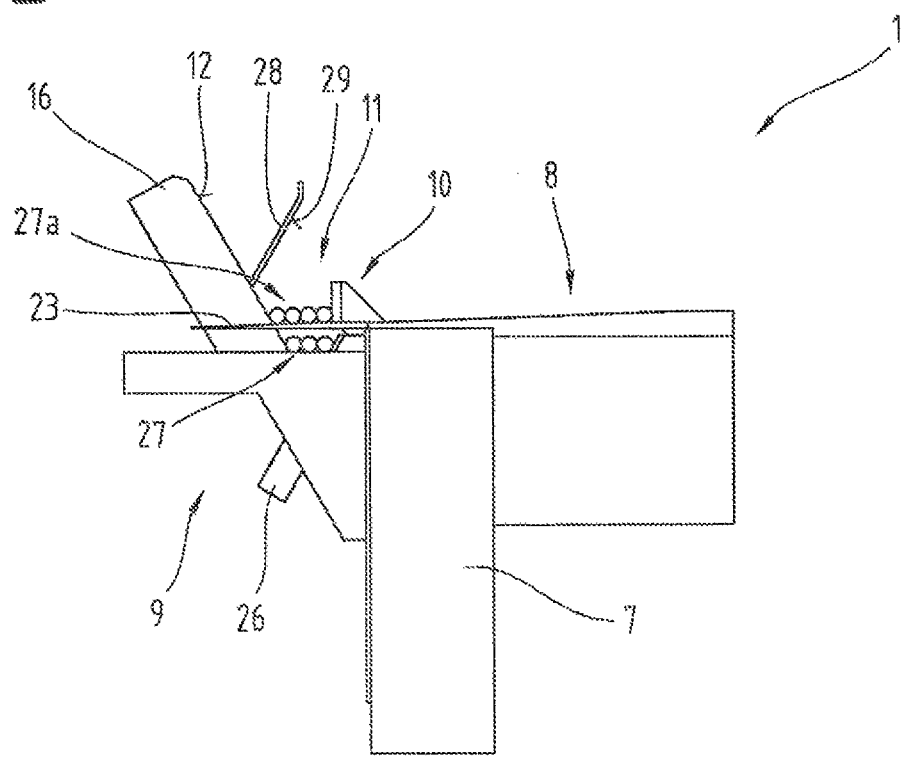

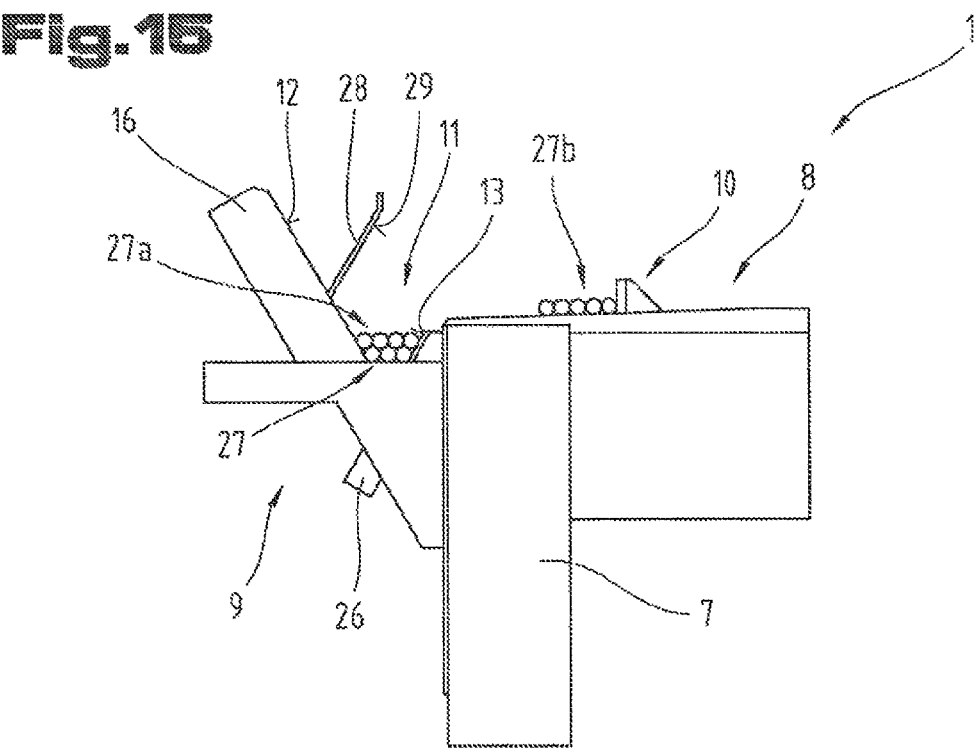
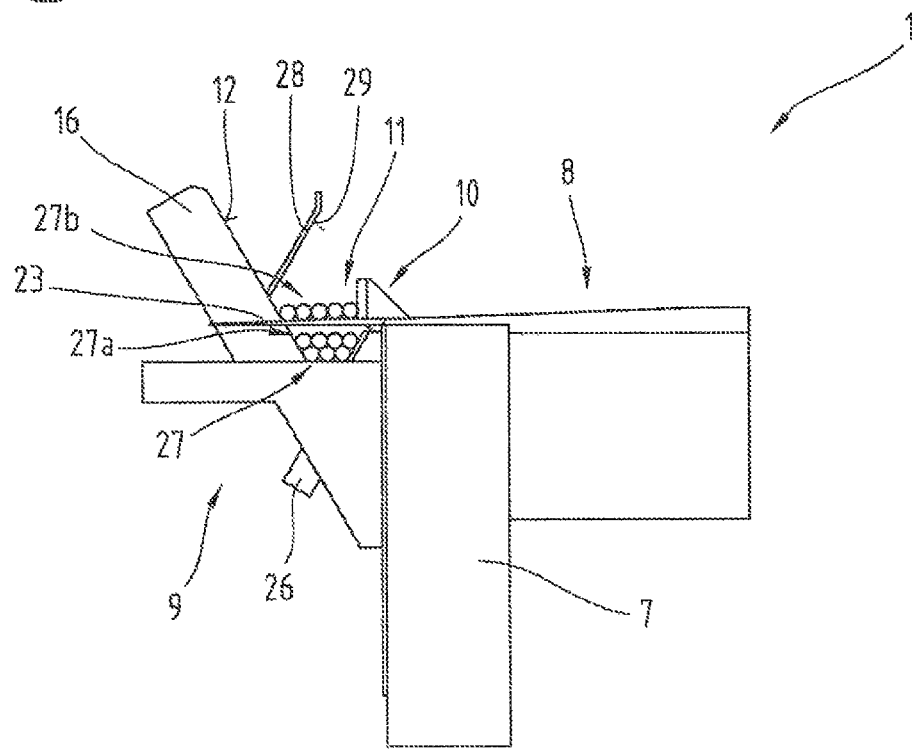

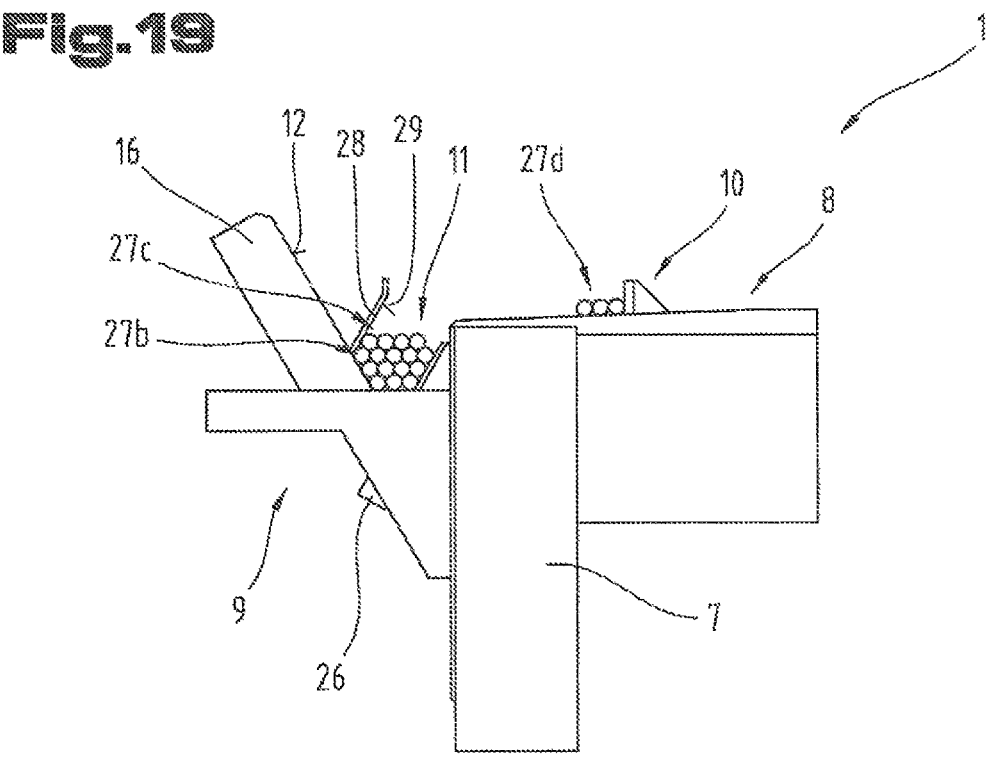
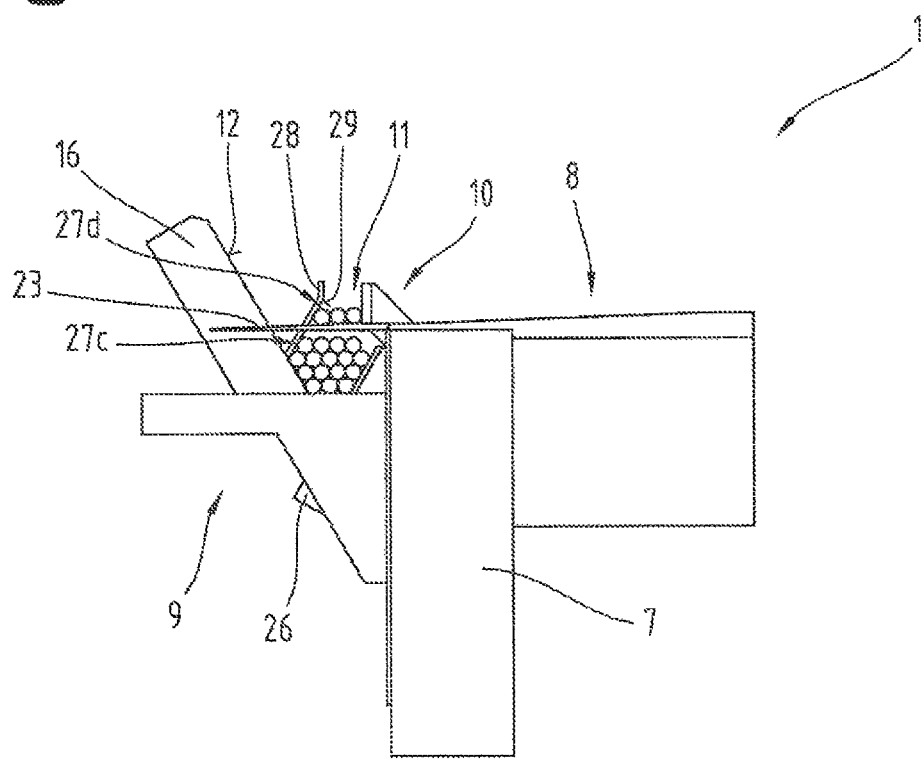

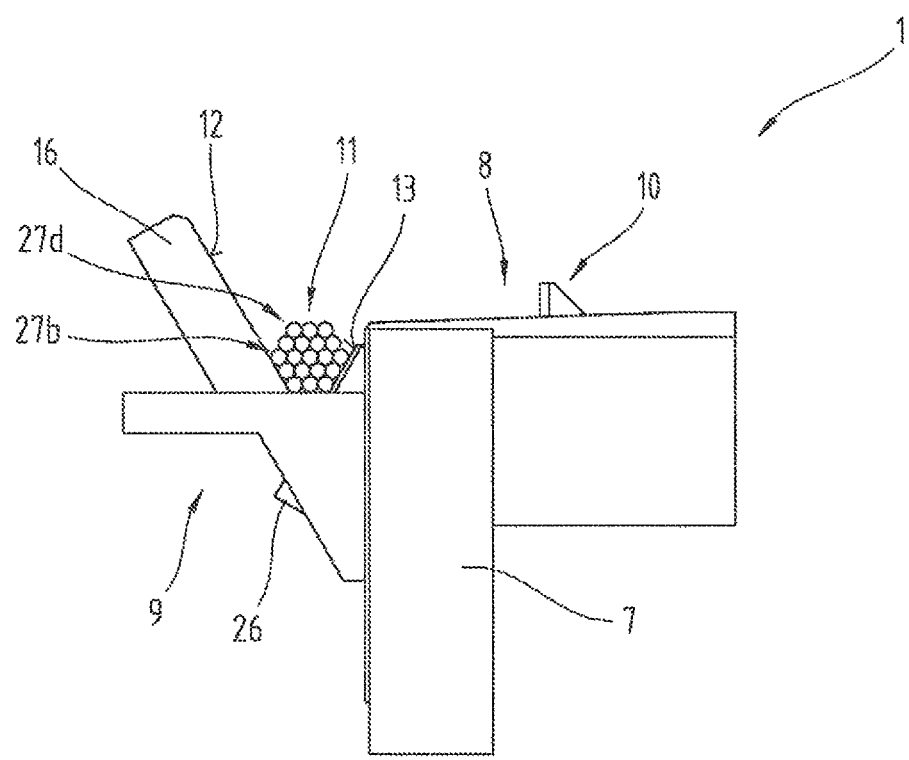

METHOD AND INSTALLATION FOR THE DEPOSITION OF PROFILED RODS

CROSS REFERENCE TO RELATED APPLICATIONS

This application is the National Stage of PCT/AT2015/050038 filed on Feb. 3, 2015, which claims priority under 35 U.S.C. §119 of Austrian Application No. A 50075/2014 filed on Feb. 3, 2014, the disclosures of which are incorporated by reference. The international application under PCT article 21(2) was not published in English.

The invention relates to a method as well as an installation for an oriented deposition of multi-edged, in particular, hexagonal profiled rods.

In the installations used till now for an oriented deposition of multi-edged, in particular, hexagonal profiled rods, in which the cross-sections of the individual profiled rods of a first profiled rods row of profiled rods arranged side by side are deposited with their longitudinal edges pointing downward on a stacking table of the installation, auxiliary rafters held one after the other at the stacking table in longitudinal extension were fixed in the area of the stacking table. At the upper front edge of the individual auxiliary rafters facing the profiled rods, corresponding V-shaped recesses were arranged side by side depending upon the cross-sectional dimensions of the respective profiled rods. The geometry of the individual recesses was selected such that on one hand the longitudinal edges of the individual profiled rods were aligned downward and hence in the direction of the stacking table and, on the other, profiled rods arranged immediately side by side lie adjoining with their side surfaces facing one another. In doing so, the profiled rods to be deposited were deposited by transfer arms one after the other in the respective V-shaped recesses. The deposition of the individual profiled rods at these respective V-shaped recesses was done at the side surface running on both sides of the lower longitudinal edge. The disadvantage in doing so is that not only separate auxiliary rafters have to be provided for each different profile geometry, but also these have to be replaced in case of a profile change according to the profile geometry. On one hand, these must be fabricated, kept ready and, on the other, must also be mounted with a considerable mounting effort.

The WO 2011/141570 A1 reports about a device as well as about a method for stacking the profiled rods having a rectangular stacking cross-section. The profiled rods are conveyed by a transfer device to transfer arms, whereby the transfer arms have a consistently sloping support surface, from which the profiled rods are deposited in the stacking shaft. To do this, the front end of the transfer arm is present in the area of the first stacking shaft wall and above the stacking shaft bottom. The deposition of the profiled rods in the stacking shaft is done through a re-adjustment of the transfer arms in the direction on the transfer device, whereby the profiled rods are placed one by one in the stacking shaft.

The U.S. Pat No. 5,222,859 A describes a device as well as a method for stacking of pipes or round rods in a stack built as hexagonal seen in the cross section. To do this, the aligned stack walls are raised corresponding to the stacking cross-section and the rods to be stacked are fed to the transfer arms. The transfer arms are built as slightly sloping over their longitudinal stretch, whereby the pipes or round rods roll on these for the transfer to the stacking shaft. Above the pipes or round rods, a braking mechanism is provided, which brakes or even stops these from doing an uncontrolled rolling movement. Moreover, the purpose of the braking mechanism is also that after the re-adjustment of the transfer arms and the lowering of the stacking shaft for deposition another row of pipes or round rods, a downward rolling of these from the transfer arms is prevented.

The SU 1150195 A shows a device for stacking of pipes or round rods in a stack built as hexagonal seen in the cross-section. To do this, the aligned stack walls are raised corresponding to the stacking cross-section and the pipes or rods to be stacked are fed to the transfer arms. The transfer arms are built as slightly sloping over their longitudinal stretch, whereby the pipes or round rods roll on these for the transfer to the stacking shaft.

In case of JP 2002 167044 A, the round profiled rods are transferred for storage in stacking shaft over a diagonal ramp built sloping in the direction of the stacking shaft in corresponding number to the transfer arms arranged above the stacking shaft. The transfer arms are also aligned slightly sloping on the first stacking shaft wall. A transfer device prevents a rolling back of the profiled rods placed on the transfer arms and strips these in the stacking shaft during a re-adjustment of the transfer arms. The profiled rods are deposited in the stacking shaft in a stack built as hexagonal when seen in the cross section. In the case of JP S57 77122 A, the round profiled rods are made available in the required number on a feed table arranged as sloping in the direction of the stacking shaft and are prevented from further rolling by stops. After a vertical adjustment of the stops, the profiled rods present on the feed table are transferred to the transfer arms present above the stacking shaft, whereby these are also aligned sloping in the direction of the first stacking shaft wall. During the transfer of the profiled rods, the transfer arms are present above the stacking shaft, whereby the first stacking shaft wall lying opposite to the feed table is built as stop for the profiled rods to be deposited. For transfer, the transfer arms are lowered so that these are arranged just above the stacking shaft bottom or just above the already deposited profiled rods. Subsequently, the stacking of the profiled rods is done by re-adjusting the transfer arms. The profiled rods are deposited in the stacking shaft in a stack built as hexagonal when seen in the cross-section.

The task of the present invention is to develop a method as well as an installation for an oriented deposition of multi-edged, in particular, hexagonal profiled rods, in which an exactly aligned row of profiled rods can be deposited at the stacking table without using additional auxiliary rafters for stacking.

In doing so, a task of the invention is resolved by a method for an oriented deposition of multi-edged, in particular, hexagonal profiled rods according to the features of one aspect of the invention. The benefits resulting from the features combination according to this aspect of the invention are that by swiveling the individual profiled rods on their longitudinal axis and the additionally connected depositing or supporting of its side surfaces, a directed downward movement takes place during the re-adjustment of the first transfer arm on one hand at the first stacking shaft wall and on the other at the guide surface built on the transfer arm. As a result of this guided lowering, an exact alignment of the individual profiled rods to one another and also one after the other can be done so that for depositing the profiled rods on the stacking table the use of additional aids for a directed deposition can be avoided. While rotating or swiveling the first profiled rod and the deposition of its side surface related to this on one hand at the first stacking shaft wall as well as the mutual support that follows, a tilting of the individual profiled rods on their longitudinal axis during lowering as well as while placing them at the longitudinal edges at the stacking shaft bottom is avoided. Moreover, the predefined formation of the stacking shaft width creates an intake area defined exactly in its width, in which the corresponding initial number of "n" profiled rods is deposited adjoining as well as supporting at both the stacking shaft walls of the stacking shaft for building the first row of profiled rods. In this way, the fundamental U-shaped cross-sectional formation of the stacking shaft creates an essentially compact profiled rod arrangement done directly side by side for starting the stacking after building the first row of profiled rods. Through the provisioning of the transfer device and the constantly holding in position relative with respect to the locally fixed base frame of the stacking installation, a safe stripping of the individual profiled rods is achieved during the readjustment of the individual transfer arms from their horizontally oriented support areas to the sloping oriented guide areas. Because of the fact that during the transfer and deposition the individual profiled rods these are not stripped randomly, but instead a guided lowering of all profiled rods is done for building the first row of profiled rods, the exact alignment to one another and the pre-determined arrangement of the same within the stacking shaft can be achieved.

The advantage of the process step selected in an embodiment is that always a steady, uniform alignment of the individual profiled rods arranged directly side by side can be achieved in this way until the deposition of the first profiled rods in the transfer device with its longitudinal edge at the first stacking shaft wall.

Moreover, a method according to the features mentioned in another embodiment is advantageous, since this can prevent an unintentional tilting or swiveling of the individual profiled rods.

Another advantageous method is described in a further embodiment, with which a deposition or a pressing of the first profiled rod of the profiled rod row at the first stacking shaft wall can be achieved. Moreover, as a result of this, a corresponding guide surface for rolling is also provided for the immediately next, second profiled rod through the side surface of the first profiled rod and also for its side surface.

Advantageous is also a method variant according to another embodiment, because even for all the further profiled rods for building the first row of profiled rods, the profiled rods already deposited in the stacking shaft are always held adjoining to one another and in this way a profiled rod can be deposited one after the other, properly aligned, on its longitudinal edge facing the stacking table, in particular, its stacking shaft bottom.

The advantage in the method step selected in another embodiment is that during a swiveling or rotating of the individual profiled rods with associated reduction of the profiled rods row in the direction of the width of the stacking shaft always a secured arrangement of the individual rods at one another can be achieved.

Moreover, a method according to the features given in another embodiment is advantageous, because in this way before starting the deposition process simply without adjustment and mounting effort, the dimensioning of the stacking shaft to be built can be built can be done at the different features, for instance the number and/or the cross-section of the individual profiled rods.

Another advantageous method is described in another embodiment, whereby a directed lowering, based on the force of gravity, of the individual profiled rods can be done without additional aids.

Advantageous is also a method variant according to another embodiment, because through this simply at least one or also several supporting surfaces arranged one after the other can be made for the profiled rods at the stacking installation, in particular, the stacking table. In this way, the profiled rods to be stacked can be deposited directly at the stacking table regardless of the dimensions or cross-sections without additional mounting effort.

Advantage of the method steps selected in another embodiment is that through the geometric selection an exact, a roughly wedge-shaped guide can be created for the downward movement. In this way, a self-centering of the profiled rods to be lowered can also be achieved using the force of gravity. This applies not only to the first profiled rod of the profiled rod row facing directly the stacking shaft wall, but also to all the other profiled rods of the same row of profiled rods to be lowered later.

Further, a method according to the features given in another embodiment is advantageous, because in this way a corresponding intake room can be created for the intake and deposition of the further profiled rods. In this way, further profiled rods can be lowered or deposited in the stacking shaft depending upon the number and choice of the further profiled rod rows. In case of a rectangular or square stacking of the profiled rods, for hexagonal profiled rods the number of profiled rods of the further rows of profiled rods, which lie directly in the first row of profiled rods, is lower than the number "n" of the profiled rods of the first row of profiled rods by one profiled rod. The third row of profiled rods can again show the number of profiled rods, which is intended for building the first row of profiled rods.

Another advantageous method is described in another embodiment, as a result of which before transferring a further number of "m" profiled rods for building the further rows of profiled rods, these can already be provided at the feed table for subsequent stacking.

Advantageous is also a method variant according to another embodiment, because like this the transfer of further profiled rods can be done easily and automatically from the feed table to the area of the stacking shaft that takes these in.

The advantage of the method step selected in another embodiment is that in this way the further profiled rods can easily be deposited in the profiled rods of the first row of profiled rods already present in the stacking shaft. Here too, the use of additional stacking aids can be avoided, because the profiled rods of the first row of profiled rods already present in the stacking installation build exactly aligned intakes over their cross-sectional shape for the further profiled rods of further rows of profiled rods.

However, the task of the invention is accomplished independently by the features of another aspect of the invention. The advantages resulting from the features combinations according to this aspect of the invention are that in the area of the stacking installation, in particular, its stacking table, a simply shaped intake room can be made in the form of a stacking shaft, which can be formed and provided without a high mechanical effort. Moreover, through the planar formation of the stacking shaft bottom for the direct deposition of the profiled rods, a formation independent of the cross-section is created, which acts for supporting the individual profiled rods with their longitudinal edges. This is independent of the respective cross-sectional dimensions of the profiled rods. Through the provisioning of the transfer device and the constantly holding in ion relative with respect to the locally fixed base frame of the stacking installation, a safe stripping of the individual profiled rods is achieved during the readjustment of the individual transfer arms from their horizontally aligned support areas to the sloping aligned guide areas.

However, a formation, as described in another embodiment, is also advantageous, since it creates a simple possibility of easily adjusting the width of the stacking shaft to the different cross-sectional dimensions of the profiled rods, for instance through a stayer formed as adjustable in transverse direction to the longitudinal stretch of the profiled rods. In this way, a stacking shaft that can be varied in its width can be made, which can be adjusted quickly and easily to the different cross-sections as well as the number of profiled rods.

Finally, the advantage of the formation according to another embodiment is that through the geometric selection an exact angle, a roughly wedge-shaped guide can be created for the downward movement. In this way, a self-centering of the profiled rods to be lowered can also be achieved using the force of gravity. This applies not only to the first profiled rod of the profiled rod row facing directly the stacking shaft wall, but also to all the other profiled rods of the same row of profiled rods to be lowered later.

The invention has been explained with the help of the figures given below for a better understanding.

Figure 5:
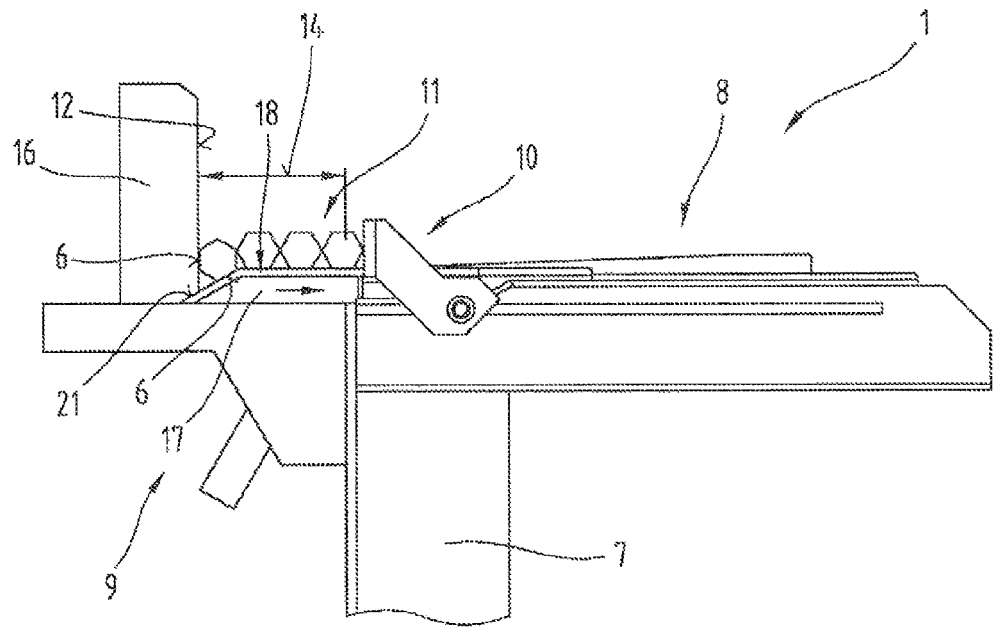
Figure 17:
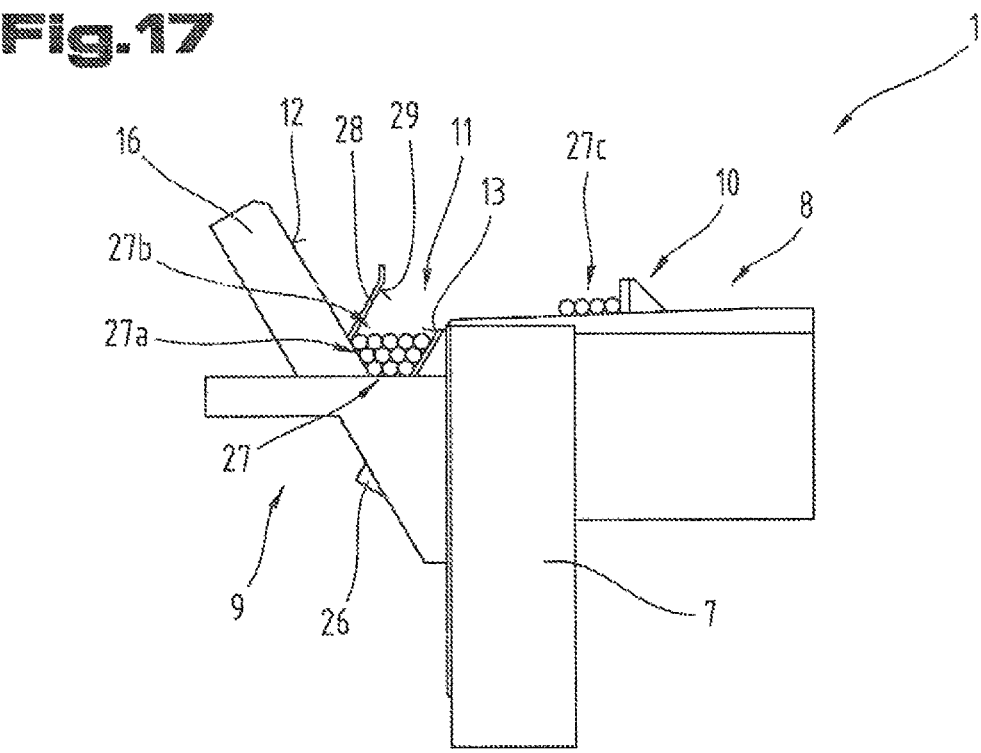
Figure 18:
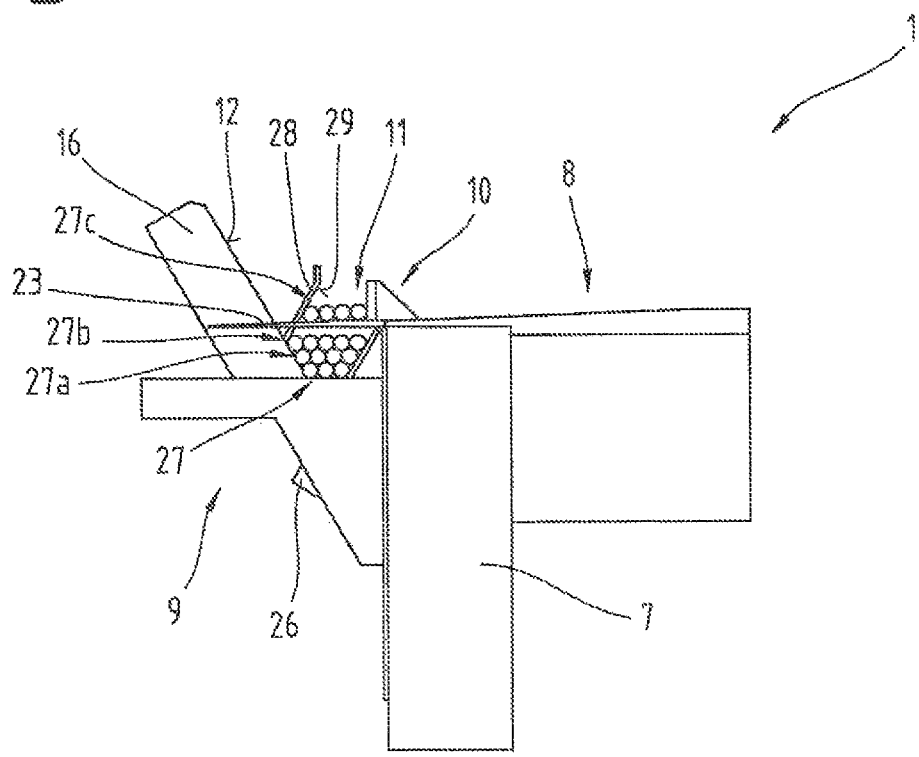

The figures show in strongly simplified, schematic representation:

FIG. 1 a stacking installation in schematic representations;

FIG. 2 a simplified cross-section of the stacking installation, with prepared stacking shaft before starting the transfer of the profiled rods, which are provided at the feed table;

FIG. 3 the stacking installation according to FIG. 2, with adjusted first transfer arm;

FIG. 4 the stacking installation according to FIGS. 2 and 3, with the profiled rods present on the first transfer arm;

FIG. 5 the stacking installation according to FIGS. 2 to 4, at the start of the lowering process with already swiveled first profiled rod;

FIG. 6 the stacking installation according to FIGS. 2 to 5, with advanced re-adjustment movement of the first transfer arm and the lowering Process that takes place while doing so;

FIG. 7 the stacking installation according to FIGS. 2 to 6, with advanced re-adjustment movement of the first transfer well as further lowering process of the profiled rods that follow;

FIG. 8 the stacking installation according to FIGS. 2 to 7 with the number of profiled rods of the first row of profiled rods completely deposited at the stacking table at the stacking shaft bottom of the stacking shaft;

FIG. 9 the stacking installation according to FIGS. 2 to 8, with lowered stacking table as well as driven out second transfer arm and further profiled rods deposited at the feed table for, forming further rows of profiled rods;

FIG. 10 the stacking installation according to FIGS. 2 to 9 with a row of profiled rods deposited on the first row of profiled rods as well as a third row of profiled rods prepared on the feed table;

FIG. 11 to FIG. 21 the steps for depositing round materials to make a stack a honeycombed outer peripheral cross-section on a stacking installation, in lateral view as well as very simplified representation.

At the outset it is mentioned here that same parts have been given the same reference signs or same component names in the different embodiments described, and the disclosures contained in the entire description can be applied analogously to same parts with same reference signs or same components names. Even the position specifications selected in the description, such as above, below, on the side, etc. refer essentially to the described and shown figure, and these position specifications can be applied analogously to the new position in case of a position change.

FIG. 1 shows a simplified and strongly conventionalized stacking installation 1 in schematic representation, whereby in the next FIG. 2 to 10 the individual steps are shown in strongly simplified display in view in the direction of longitudinal stretch f the profiled rods 2 to be deposited.

FIG. 2 to 10 show the consecutive individual steps of deposition of multi-edged, in particular, hexagonal profiled rods 2. In doing so, it is mentioned that the profiled rods are long goods with a preferable outer hexagonal cross-sectional shape. These can be solid material as well as hollow profiles of the profiled rods 2. However, other multi-edged profiled rods 2 can also be deposited, whereby a corresponding adjustment or tuning is necessary owing to the different angle ratios. In case of hexagonal cross-sectional shapes of the profiled rods 2, a stack formation can be achieved without free spaces between the immediately adjacent profiled rods 2.

The profiled rods 2 show a longitudinal stretch as well as a middle axis stretching between the ends, whereby several profiled rods 2 can be arranged immediately side by side to make a first row 3 of profiled rods. After building the first row 3 of profiled rods, at least one more profiled rods row 4 with profiled rods 2 respectively showing the same cross-sectional dimensions is deposited on the first row 3 of profiled rods. The cross-sections of the individual profiled rods 2 of the first row 3 of profiled rods should be aligned in such a way that their longitudinal edges 5 are stored as pointing downward. This helps in getting a consistent bundle of profiled rods 2 with the same cross-section after strapping with holding bands with the subsequent one above the other arrangement of several rows 3, 4 of profiled rods and the associated stack formation. Furthermore, seen in cross-section, the individual profiled rods 2 show a corresponding number of side surfaces 6 depending upon the number of the respective longitudinal edges 5.

Since always preferable the profiled rods 2 having the same cross-section dimensions to one another are put together side by side as well as, if needed, also one above the other in several rows 3, 4 of profiled rods—see FIG. 9—for transportation to make a bundle, these or their components have always been given the same reference symbol in the individual figures.

The simplified stacking installation 1 shown here in FIG. 1 includes a base frame 7, a feed table 8 built or arranged upon it as well as a stacking table 9 stored guided preferably on the base frame 7 as well as adjustable on it for depositing the individual profiled rods 2. At the feed table 8 one or more stop elements can be provided in the longitudinal stretch of the profiled rods 2, arranged one after the other, which are not discussed in more detail. These help in putting together the profiled rods 2 to make a packet, which are deposited as ready on the feed table 8 for building the first row 3 of profiled rods. This can be done either through a separate conveyor device of the profiled rods 2, if the profiled rods are deposited on the feed table 8 and are stored intermediately or else can be done by one or more transfer devices 10 arranged in the area of the feed table 8.

The profiled rods 2 arranged as ready on the feed table 8 are displaced or moved by one or more transfer device 10, starting from the feed table 8 by doing a cross-wise movement in vertical direction with respect to the longitudinal stretch of the profiled rods 2 till the area of the stacking table 9. In doing so, the transfer device 10 can be adjusted from a work position protruding over the feed table 8 to a rest position present within the feed table 8. The rest position of the transfer device 10 can be useful e.g. if after transferring the profiled rods 2 and building the first row 3 of profiled rods, further profiled rods 2 have already been placed on the feed table 8 for building another row 4 of the profiled rods so that the transfer device 10 can be adjusted below the further profiled rods 2 in transverse direction with respect to the longitudinal stretch of the same on the side facing away from the stacking table 9. Subsequently, the transfer device(s) 10 is/are adjusted again to the working position and a new transfer process can be initiated.

Further, a stacking shaft 11 is arranged or built in the area of the stacking table 9. In the current embodiment, the stacking shaft 11 is formed/built through the first and second stacking shaft walls 12, 13 in a width 14 stretching in vertical direction between them. Preferably, the width 14 can be varied and adjusted and locked depending upon the cross-sectional dimension as well as number of profiled rods 2. The stacking shaft is further restricted in its depth by a stacking shaft bottom 15 formed, preferably planar, at the stacking table 9. In doing so, it is mentioned that the stacking shaft 11 or the stacking shaft walls 12, 13 restricting it as well as the stacking shaft bottom 15 need not be provided or formed over the entire length or longitudinal stretch of the profiled rods 2, but instead can be built through several sub-surfaces or individual wall sections arranged one after the other aligning in longitudinal stretch of the profiled rods 2. In this way, at least one of the stacking shaft walls 12 can be built from one or more stayers 16 protruding from the stacking table 9. However, instead of individual stayers 16, it would be possible to build a continuous support wall, at which the first stacking shaft wall 12 is formed or built for restricting the stacking shaft 11. Preferably, both the stacking shaft walls 12, 13 are arranged parallel to each other. Moreover, these can also show a vertical alignment.

The determination of the width 14 for building the stacking shaft 11 is essential for the subsequent oriented deposition of the individual profiled rods 2 for building the first row 3 of profiled rods, because the individual profiled rods 2 of the first row 3 of profiled rods are to be deposited or supported with their longitudinal edges 5 directly at the stacking shaft bottom 15 and both the outer profiled rods 2 arranged immediately adjacent to both the stacking shaft walls 12, 13 are to be supported or deposited with their side surfaces 6 at the stacking shaft walls 12, 13. With this, as shown and described below, an unintended tilting of both the outer profiled rods 2 of the first row 3 of the profiled rods can be prevented for the subsequent stack formation.

Depending upon the number as well as dimension of the individual profiled rods 2, which are to be put together to make a stack or bundle, the number of profiled rods to be put together to make the bundle is to be determined. In doing so, attention must also be paid to the bundle weight for the subsequent transportation. If the total number of the profiled rods 2 to be deposited is determined, the individual layer formation of the preferred several profiled rod rows 3, 4 is determined. Depending upon the number of the profiled rods 2, which build the first profiled rods row 3, the width 14 between both the stacking shaft walls 12, 13 is then determined depending upon the respective cross-section dimension of the profiled rods 2. The width 14 of the stacking shaft 11 is calculated from the product value of a cross-section dimension between the parallel running aligned side surfaces 6 of a profiled rod 2 and the initial number "n" of profiled rods 2 of the first row 3 of profiled rods. In case of a hexagonal cross-section dimension, this is also known as the so-called width across flats (SW).

If the value for the width 14 to be set is determined and defined, the stayer(s) 16 building the first stacking shaft wall 12 can be adjusted automatically at the stacking table 9 to the corresponding relative position through a set-up agent not described further. The determination of the width 14 as well as the subsequent initiation and execution of adjustment movement for setting the width of the stacking shaft 11 can be done computerized by means of control unit. If the pre-determined position is reached and the stacking shaft 11 shows the width 14 corresponding to the profiled rods 2, a locking of the stayer(s) 16 can be done at the stacking table 9. In case of an adequate guiding of the stayer 16 as well as in case of set-up agents built as self-inhibitory, such as threaded spindles, step motors, etc., a fixing of the position can even be avoided.

Since the individual profiled rods 2 can show deviations caused by tolerances in their outer dimensions or cross-section dimensions, this must be taken into consideration accordingly while determining the width 14. In doing so, a minimum dimension of the width 14 is to be maintained for all cases, in order to be safely able to arrange the entire number of profiled rods 2 for building the first row 3 of profiled rods in corresponding alignment between both the stacking shaft walls 12, 13. In case of a too small or too short selected width 14, the entire number of profiled rods 2 cannot be deposited properly in the stacking shaft 11 at its stacking shaft bottom 15. If the width 14 is selected as too large, then a side-wise tilting of at least one of the profiled rods 2 can take place. The interpretation or the description of the width 14 is to be understood under this aspect, at which this must correspond at least to this product value. On the other hand, if the individual profiled rods 2 are fabricated in their cross-section dimensions with very low tolerance dimensions to one another, the width 14 can be pre-determined relatively exactly and can be selected in all cases as so big that in all cases the entire initial number "n" of profiled rods 2 for building the first row 3 of profiled rods can be placed without any problem between both the stacking shaft walls 12, 13 and are also placed there supporting at the stacking shaft walls, 12, 13.

At least a second stacking shaft wall 13 is formed or built immediately adjacent at the feed table 8 at the base frame 7 in the embodiment shown here. In this way, it would also be possible to build at least one of the stacking shaft walls 12, 13 at the strip-like elements 7 and/or at the stayer 16, in order thus to avoid a direct, hard contact of the metallic parts. The strip-like elements can be made, for instance, from plastic and/or rubber strips as also wooden strips.

The stacking shaft bottom 15 of the stacking shaft 11 is built here as planar and helps in directly depositing the profiled rods of the first row 3 of profiled rods with their longitudinal edges 5.

Further, the stacking installation 1 includes at least one, preferably several first transfer arms 17, which are adjusted as protruding before displacing the profiled rods 2 placed on the feed table 8 in the area of the stacking shaft 11 and act(s) there for the intermediate placing of the profiled rods 2 to be placed in the stacking shaft 11 for building the first row 3 of profiled rods. The first transfer arm(s) 17 have support surfaces 18 at their upper sides facing the profiled rods 2.

As can be seen from FIG. 2, the first transfer arms 17 shown here are in a driven in position in the area of the feed table 8 and do not protrude in the stacking shaft 11. The feed table 8 builds a support level 19 for placing or supporting the individual profiled rods 2, which in the given embodiment are aligned slightly sloping in the direction of the stacking shaft 11. In this driven-in position of the transfer arms 17 their support surfaces 18 are arranged, seen in vertical direction, below the support level 19 so that the profiled rods 2 lie solely on the support level 19 built by the feed table 8.

The profiled rods 2 for building the first row 3 of profiled rods are shown as lying in full lines on the feed table, whereby the same row 3 of profiled rods is shown in dotted line in the already stored position in stacking shaft 11.

As can now be seen better from FIG. 3, the transfer arm 17 is present here in its intake position, protruding from the feed table 8, of the individual profiled rods 2 for starting the transfer process of these and for the subsequent oriented deposition in the stacking shaft 11. In the present example, the number "n" of the profiled rods 2 for building the first row 3 of profiled rods is selected as four profiled rods 2. At least an initial number of "n" profiled rods 2 are provided for the transfer process on the feed table 8, whereby the profiled rods 2 are placed side by side as well as resting on one of their side areas 6 on the feed table 8 For the transfer then the number "n" of the profiled rods 2 is selected, which has been determined earlier.

The first transfer arms 17 are formed or built while doing so in such a way that in their driven out position the feed table 8 with its support level 19 goes over the support areas 18 in the transfer area between the feed table 8 and the stacking shaft 11 in a planar way. Furthermore, in this position, seen from top, the support area 18 is arranged above the stacking shaft bottom 15. The transfer arms 17 show their respective first ends 20 at their first end areas facing away from the feed table 8. In doing so, further the first end areas of the first transfer arms are provided with sloping aligned guide areas 21 starting from the horizontally aligned support areas 18. In this, the guide areas 21, starting from the respective support areas 18 reach till in the area of the first end 20 and there till near the lower side 22 of the transfer arm 17. With this, the first end 20 of the transfer arm 17 is almost shaped like a wedge running between the lower side 22 and the guide area 21.

Preferably the adjustment of the first transfer arm 17 is done before starting the transfer process and, namely, to the extent that the support area 18 of the transfer arm 17 either reaches till the first stacking shaft wall 12, ends at this or protrudes slightly over the first stacking shaft wall 12 on the side facing away from the feed table 8. In the transfer area between the support area 18 and the guide area 21, therefore, a bend is formed, at which the support area 18 ends and the guide area 21 begins. In doing so, the adjustment of the first transfer arm 17 is done starting from the feed table 8, preferably to the extent that its first ends 20 reach at least till the first stacking shaft wall 12, but preferably protrude over the stacking layer 11 on the side facing away from the feed table 8. This prevents an unintended and an uncontrolled falling down of the profiled rods 2 from the first transfer arms 17 in the stacking shaft 11.

However, it would also be possible that the transition area between the support area 18 and the guide area 21 is arranged on the first transfer arm 17 within the width 14 of the stacking shah 11 before starting the transfer process of the profiled rods 2 from the feed table 8. With this, the transition area or the bend is distanced from the first stacking shaft wall 12 in the direction of the feed table 8. The first end 20 of the first transfer arm 17 then reaches either till the area of the first stacking shaft wall 12, ends at this or protrudes negligibly over the first stacking shaft wall 12. With this, upon transfer of the profiled rods 2 for building the first row 3 of the profiled rods on the first transfer arm 17 at least the first profiled rod 2 in the transfer direction is arranged adjacent at the first stacking shaft wall 12 as well as at the guide surface 21. This position of the first profiled rod 2 then corresponds to the position as described in the FIG. 5 given below. With this, the process of depositing the longitudinal edge 5 of the first profiled rod 2 in the direction of transport can be skipped or omitted. In doing so, attention must always be paid here to a correct position of the individual profiled rods 2 during the transfer process.

As now show further in FIG. 4, the initial number of "n" profiled rods 2 is displaced by means of the transfer device 10 in vertical direction with respect to the longitudinal stretch of the profiled rods 2 on the first transfer arm 17 present above the stacking table 9. This displacement or cross-wise movement is done in such a way that the individual profiled rods 2 lie adjacently at their longitudinal edges 5 facing one another and lie with their side surfaces 6 first at the feed table 8 and subsequently at the support areas 18 built or formed at the first transfer arm(s) 17.

In the given design example, the complete number of "n" profiled rods 2 are displaced all at once by the transfer device 10 from the feed table 8 to the first transfer arm 17. It would also be possible that only individual profiled rods 2 are displaced one by one by the transfer device 10 from the feed table 8 to the first transfer arm 17, whereby this is done for so long till the complete number of "n" profiled rods have been provided at the first transfer arms 17 for storage in the stacking shaft 11.

The cross-deposition of the profiled rod(s) 2 is done to the extent that the first profiled rod 1 in the transfer device with its longitudinal edge 5 is deposited or positioned at least at a first stacking shaft wall 12, arranged distanced from the feed table 8. The subsequent profiled rods 2 are moved in the direction of the first stacking shaft wall 12 for so long till the complete, initial number of "n" profiled rods 2 lie adjacent at their longitudinal edges 5 respectively facing one another. By means of the transfer device 10 the profiled rods 2 can continue to be held lying adjacent to one another.

In FIG. 5 it is now shown that the first transfer arm(s) 17 are re-adjusted or displaced in the direction of the feed table 8. During this re-adjustment movement of the first transfer arm(s) 17 the first profiled rod 2 is brought from its position at the support area 18 in the area of the guide areas 21 of the first transfer arm 17. The individual profiled rods 2 continue to be held positioned by the transfer device 10 relative with respect to the stacking shaft 11 or the feed table 8. Owing to the sloping shape of the guide areas 21 there is a swiveling of the first profiled rod 2 along its longitudinal axis so that it lies with one of its side surface 6 at the first stacking shaft wall 12 and with the other side surface 6 at the sloping aligned guide surfaces 21 of the first transfer arm 17. With this, at least the first stacking shaft wall 12 and the guide area 21 jointly build the contact surfaces for the side surfaces 6 of the first profiled rod 2 of the first row 3 of the profiled rod to be deposited.

FIG. 6 shows the further progress of the deposition process, whereby here with a progressive re-adjustment of the first transfer arm 17 a guided lowering of the first profiled rod 2 at the first stacking shaft wall 12 as well as at the guide areas 21 is done for so long till the first profiled rod 2 with its longitudinal edge 5 facing downward and hence the stacking shaft bottom 15 lies directly at the stacking shaft bottom 15 of the stacking shaft 11. In order to make the sliding of the profiled rods 2 easier, the first stacking shaft wall 12 and/or the guide area 21 can be equipped with a slide lining or can be designed with it.

Owing to the progressive re-adjustment there is not only the guided lowering of the first profiled rod 2, but also the subsequently arranged further profiled rods 2 are turned or swiveled one by one along their longitudinal axes to the extent that the further profiled rods 2 are deposited with their side surfaces 6 at the sloping aligned guide areas 21 of the first transfer arm 17. In doing so, there is further a guided lowering of the further profiled rods 2 till their direct contact with their respective longitudinal edges 5 at the stacking shaft bottom 15 of the stacking shaft 11, till the building of the first row 3 of the profiled rods is completed. This guided lowering can be seen at best from an integrated view of FIGS. 5 and 6. If the first row 3 of profiled rods lying completely with their longitudinal edges 5 at the stacking shaft bottom 15 is deposited, both the outer profiled rods 2 of the first row 3 of profiled rods lying adjacent at both the stacking shaft walls 12, 13 of the stacking shaft 11 are supported and thus build at their side surfaces 6 an adjacent lying row of profiled rods 2.

In order to prevent an unintended tilting of the first profiled rod 2 with the driven out transfer arm 17, the first transfer arm 17 is adjusted protruding over the stacking shaft 11 so far from the feed table 8 that the horizontally arranged support areas 18 reach till the first stacking shaft wall 12 and the sloping aligned guide surfaces 21 protrude over the first stacking shaft wall 12. In order to ensure a proper and safe lowering of the individual profiled rods 2 for building the first profiled rod row 3, the initial number of "n" profiled rods 2 should be held adjoining each other by the transfer device 10 during the consecutive lowering movement on the stacking shaft bottom 15. During the lowering process of the first profiled rod 2, depending upon the cross-sectional dimension, the second profiled rod 2 of the first profiled rod row 3 immediately near to the first profiled rod 2 is lowered with its side surface 6 facing the first profiled rod 2 at the side surface 6 of the first profiled rod 2 facing it. This always results in a mutual placing and support of the individual profiled rods 2 at one another. This process of guided lowering of the individual profiled rods 2 against one another is done for so long till all profiled rods 2 lie at the stacking shaft bottom 15 with their longitudinal edges 5 for building the first row 3 of profiled rods.

Owing to the swiveling or rotation and the related tilting of the individual profiled rods 2, there is also a reduction of the first row 3 of profiled rods in transverse direction with respect to its longitudinal stretch starting from their longitudinal edges 5 lying adjacent next to as well as facing one another. To be able to accommodate this reduction, it is advantageous, if during the lowering movement of the individual profiled rods 2 of the first profiled rod row 3 in the transfer device 10 adjustment is done gradually for so long in the direction of the first stacking shaft wall 12, till a gap between the first stacking shaft wall 12 and the transfer device 10 arises that corresponds to the width 14 of the stacking shaft 11.

As already described earlier, the selection of the width 14 of the stacking shaft 11 depends on the number "n" of profiled rods 2 as well as their cross-sectional dimension. Since the use of additional stacking aids, in particular, stacking strips is avoided and the deposition of the individual profiled rods 2 is intended directly at the stacking table 9, the corresponding width 14 of the stacking shaft 11 is to be determined and set before starting the deposition process of the first row 3 of profiled rods.

As can be seen best from FIG. 2, the stayers 16 building the first stacking shaft wall 12 can be displaced with respect to the fixed formed, second stacking shaft wall 12 with reference to it in vertical direction at the stacking table 9. This makes it possible, while determining the width 14 of the stacking shaft 11 depending upon the respective cross-sectional dimension of the profiled rod 2 to be deposited as well as the first number "n" of profiled rods 2, to carry out the adjustment automatically, in order thus to avoid unnecessary adjustment and mounting effort. In doing so, for instance, the setting of the width 14 can be done through drive means, not described in detail, such as step motors, threaded spindles, adjusting cylinders, etc. In doing so, the individual stayers 16 and/or a continuous formed shaft wall can be inserted in corresponding guides and adjusted and held positioned there at the pre-defined position according to the width 14 by means of positioning devices.

Preferably, the first and the second stacking shaft wall 12, 13 are aligned parallel to each other. In the given design example, both the stacking shaft walls 12, 13 are arranged especially in vertical alignment to each other. Moreover, the stacking shaft bottom 15 is aligned at right angles to it and hence runs horizontally. This defines a cross-section of the stacking shaft 11 at least in its width measurement and hence in the direction of the longitudinal stretch of the same or the longitudinal stretch of the profiled rods 2 to be deposited.

As can be seen further from FIG. 5, the slope of the guide surface or of the guide surfaces 21 at the first transfer arms 17 is selected in such a way that these in case of hexagonal profiled rods 2 to be deposited enclose an angle of 60° between the first and the second stacking shaft wall 12. This earlier specified value of the angle between the first and the second stacking shaft wall 12 and the guide surface(s) 21 at the first transfer arm 17 depends on the number of longitudinal edges 5 of the profiled rod 2 and can be adjusted according to it in case of a different number—in the present case, six longitudinal edges.

If now, as shown in FIG. 8, the first row 3 of profiled rods with the individual profiled rods 2 is arranged lying in the stacking shaft 11 at its stacking shaft bottom 15 immediately next to one another as well as against one another, then one or more further rows 4, 3 of the profiled rods can be deposited on the first row 3 of the profiled rods.

As can now be seen from FIG. 9, after building the first row 3 of profiled rods the stacking table 9 is to be lowered for taking further rows 4 of profiled rods to the extent that at least one, preferably several, second transfer arms 23 can be adjusted for the transfer of a further number of "m" profiled rods 2 for building further profiled rods row 4 above the profiled rods 2 of the profiled rods row 3 already present in the stacking shaft 11 starting from the feed table 8 at least till the first stacking shaft wall 12. The second transfer arm 23 used in this embodiment is built in vertical direction with respect to the stacking shaft bottom 15 with a different, in particular, smaller thickness than the first transfer arm 17. In doing so, the second transfer arm 23 can be called as sword-shaped. Because of the presence of the first profiled rod row 3, there is a formation of V-shaped intake grooves between profiled rods 2 lying immediately next to one another or else support areas at the profiled rods 2 inclined facing one another, which help in the directed deposition of further profiled rods 2 of the profiled rod row 4.

For building the further profiled rods row 4 at the feed table 8 at least a further number of m profiled rods 2 is provided side by side for building the further row of profiled rods 4 as well as on a row lying on their side surfaces 6. The second transfer arms 23 are to be adjusted starting from the feed table 8 with their first ends at least till the first stacking shaft wall 12 of the stacking shaft 11 as well as, beyond it, if needed. Subsequent to this, the further number of "m" profiled rods 2—in the present design example three pieces—are displaced from the feed table 8 in vertical direction to their longitudinal stretch by means of the transfer device 10 on the second transfer arm 23. Using the transfer device 10, the further number of "m" profiled rods 2 are held adjacent next to one another with their longitudinal edges 5 facing one another. For depositing the further profiled rods 2 and the building of the further profiled rods row 4 related to this, the second transfer arm 23 is re-adjusted in the direction of the feed table 8. In doing so, the further profiled rods row 4 is held in position by the transfer device 10 relative with respect to the feed table and further the individual profiled rods 2 are deposited step by step on the first row 3 of profiled rods.

FIG. 10 shows a further lowered position of the stacking table 9 at the base frame 7 as opposed to the depiction in FIG. 9. Here, the first and the second rows of profiled rods 3, 4 are already deposited in the stacking shaft 11. A further, third profiled rod row 24, which in the present design example matches the number "n" of profiled rods 2 of the first row 3 of profiled rods, has already been provided at the feed table 8. However, a lower number "n" of profiled rods 2 could also be provided for the transfer and for the subsequent stack formation. The transfer process in the stacking shaft 11 can be done in a similar way, as described earlier in FIG. 9 for the second or further profiled rods row 4.

It would also be possible to use the transfer arm 17 described for transferring the first row 3 of profiled rods for transferring the further profiled rod rows 24, 4, 3 instead of the earlier described second transfer arm 23. With that, the first transfer arms 17 would also build the second transfer arms 23.

As already described earlier, several profiled rod rows 3, 4, 24 can also be deposited one above the other to make a stack in the stacking layer 11 of the stacking table 9. If the stack is built completely, it can either put together to make a bundle either directly in the area of the stacking installation 1 or on a device for this purpose arranged at some distance and can also be strapped, if needed. This is adequately known and will, therefore, not be described further.

The same also applies to the provision of the profiled rods 2 in the area of the feed table 8. Mostly the individual profiled rods 2 are placed on the feed table 8 on the side lying opposite to the stacking table 9 by means of a cross-conveyor not shown. This can take place, for instance, through the different conveyor devices, which have not been shown here for a better clarity.

FIG. 11 to 21 show a further and possible independent design example of the stacking installation 1, whereby again same reference symbols/component names have been used for the same parts, as done in the previous FIG. 1 to 10. In order to avoid unnecessary repetitions, a reference is made to the detailed description in the previous FIG. 1 to 10.

The method described earlier for depositing the edged, in particular, hexagonal profiled rods 2 can also be carried out at the same stacking installation 1 in a shape adjusted to different cross-sectional shapes of the profiled rods 2. In the present design example, the profiled rods 2 round material, in particular, pipes or cylindrical rods, are stacked together to make long goods and thereafter bound together to make a bundle. Seen in the cross-section, mostly a honeycombed or a hexagonal cross-section is selected as the outer boundary in case of round materials. In doing so, the position of the outline of the outer boundary is selected such that a side boundary surface 25 of the stack or the bundle to be built is arranged parallel with respect to the stacking shaft bottom 15 of the stacking shaft 11. Since this fundamental design of the stacking shaft 11, in particular of its stacking shaft bottom 15 is the same, as already described earlier in FIG. 1 to 10, this stacking shaft bottom 15 is also planar and, in particular, aligned horizontally.

To do this, at least one stayer 16 or the stayers 16 are to be swiveled or adjusted to a degree on the side facing away from the feed table 8 so that an angle of 120° is enclosed between the first stacking shaft wall 12 and the stacking shaft bottom 15. The second stacking shaft wall 13 is not built here directly through the base frame 7 or the stop bars arranged on it, but instead though at least one or more stacking help elements 26 arranged one after the other at the stacking table 9 in longitudinal stretch of the profiled rods 2. Both the stacking shaft walls 12, 13, immediately neighboring the stacking shaft 11 in the area of its stacking shaft bottom 15, enclose between themselves an angle of 60°. With this, the second stacking shaft wall 13 also encloses with the stacking shaft bottom 15 an angle of 120°, but aligned tilted towards the feed table 8.

Depending upon the selected cross-section size of the stack or the bundle to be built from the round material, first again the total number of the profiled rods 2 is to be determined. In doing so, preferably the total number of profiled rods 2 is selected such that there is always a gap-less arrangement of the profiled rods 2 in the area of the side boundary surfaces 25. Here, it must be mentioned that in case of a corresponding arrangement and alignment of the individual profiled rods 2 to one another along the side boundary surfaces 25 the number of profiled rods 2 arranged need not always be the same. Like this, despite a hexagonal cross-section, the side length of the side boundary surface 25, seen in cross-section, can have different lengths. Preferably here the side boundary surfaces 25 lying adjacent to one another are aligned not only parallel to one another, but instead also show the same side length.

In the design example shown here, the cross-section of the bundle of profiled rods 2 to be built is selected such that in the area of each of the side boundary surfaces 25, always three profiled rods 2 are arranged immediately next to each other. This results in a total number of five profiled rods 27 to 27*d* being deposited consecutively in the stacking shaft 11 one above the other as well as offset to one another. In doing so, it is mentioned that the stack formation shown in FIG. 11 to 21 is selected only as an example and the number of profiled rods 2 as well as size of the cross-section shapes can be selected freely.

Before starting the transfer process of the first profiled rod row 27, the corresponding width 14 of the stacking shaft 11 is to be determined in the area of the stacking shaft bottom 15 depending upon the cross-section dimension of the profiled rods 2 to be stacked as well as their number in the region of the side boundary surfaces 25 of the stacking cross-section facing the stacking shaft bottom 15. After determining and setting the width 14 of the stacking shaft 11, at least one stayer 16 or the stayers 16 are held locally in their inclined position at the stacking table 9 for the duration of the respective stacking process. Owing to the V-shaped alignment of both the stacking shaft walls 12, 13 to one another starting from the stacking shaft bottom 15, a corresponding side distance f the stayers 16 to the base frame 7 is to be selected/set. The stacking aids 26 can be formed through strip-shaped components, which are guided in their longitudinal stretch as well as inclined alignment with respect to the stacking shaft bottom 15 at the stacking table 9 as well as preferably can be adjusted step by step with respect to this. Because of the step-wise adjustment of the stacking aids 26 with respect to the step-wise lowering of the stacking table 9 and the related, always higher sticking out of the stacking shaft bottom 15, the two stacking shaft walls 13 are built in this way one after the other at the stacking table.

For building a further restriction of the stack subsequent to the first stacking shaft wall 12 of the stayer 16, a stop element 28 can be arranged as protruding at this above the stayer 16 on the side facing the feed table 8. A contact area 29 of the stop element 28 encloses in itself an angle of 120° with the first stacking shaft wall 12 facing the stacking shaft bottom 15. This creates a stop on the side of the stacking shaft 11 lying opposite to the feed table 8, which defines a further side boundary surface 25 of the stack to be built. Through the provision of these stop elements 28, a total of four side boundary surfaces 25 are defined for building the stack together with the structural elements described earlier, namely the stacking aids 26 with the arranged or formed second stacking shaft wall 13, the stacking shaft bottom 15, the first stacking shaft wall 12 as well as the contact area 29.

FIG. 11 shows that in the area of the stacking table 9, the stacking shaft 11 is built in corresponding width 14 as well distance from the feed table 8 or base frame 7 in the area of the stacking table 9. On the feed table 8, the initial number of profiled rods 2 is provided for building the first row 27 of profiled rods.

FIG. 12 shows that here the second transfer arm 23 described earlier, projecting over the feed table 8, is adjusted as reaching at least till the first stacking shaft wall 11. Subsequent to this, the first profiled rods 2 are displaced by means of the transfer device 10 as well as in direction of the stayer 16 so that these are present in the area of the stacking shaft 11, especially lie at the first stacking shaft wall 12. Subsequent to this, the second transfer arm 23 is re-adjusted in the direction of the feed table 8, whereby the individual profiled rods 2 are held by the transfer device 10 positioned in cross-direction or in transfer direction with respect to the stacking shaft 11. The re-adjustment of the second transfer arm 23 causes the deposition of the first row 27 of the profiled rods in the stacking shaft 11. In doing so, the profiled rods 2 lie at the stacking shaft wall 15 as well as at both the stacking shaft walls 12, 13.

It is mentioned here that in place of the second transfer arm or second transfer arms 23 described here, even the first transfer arm(s) can be used. For this reason, we will indicate only transfer arm or arms in the discussion that follows.

It is now shown in FIG. 13 that the stacking table 9 has now been adjusted vertically downward for taking in a further row 27a of profiled rods and is hence lowered with respect to the level of the feed table 8, and the corresponding number of profiled rods for building the further row 27a of profiled rods is stockpiled on the feed table 8.

FIG. 14 again shows the driven out position of the transfer arm 23 in the region of the stacking shaft 11, whereby for giving away the further row 27a of profiled rods, the individual profiled rods 2 have already been displaced by means of the transfer device 11 in the region of the stacking shaft 11. By means of a corresponding back-adjustment or back-displacement of the transfer arms 23, the second row 27a of the profiled rods is deposited on the first row 27 of profiled rods.

For taking in a third row of profiled rods 27b, again the stacking table 9 is adjusted downward or lowered in vertical direction to the corresponding extent and the profiled rods 2 for building the third row 27b of the profiled rods are stockpiled on the feed table 8. An adjustment of the stacking aids 26 relative to the stacking table 9 is done to the extent of the downward adjustment movement of the stacking table carried out, in order thus to build the corresponding second stacking shaft wall 13 for the next row 27b of the profiled rods to be deposited in the region of the stacking shaft 11 facing the feed table 8. With that, the stacking aids 26 can always be adjusted in a constantly protruding position over the stacking shaft bottom 15 with respect to the stacking table 9 in several consecutive steps.

FIG. 16 to 20 show the further steps to be carried out analogously, in order first to stockpile the further profiled rod rows 27b to 27d first at the feed table 8 and thereafter transfer these with the transfer device 10 to the driven out transfer arm 23 and subsequently to lay these on the already deposited row 27 of the profiled rods.

While depositing the fourth row 27c in this design example, the first deposition in the transfer direction of the first profiled rod 2 of this row 27c of the profiled rods at the stop elements 28 or at their contact surfaces 29.

The profiled rods row 27c as well as possibly further profiled rods rows to be deposited are held in position by the transfer device 10 relative to the stacking table 11 as well as at the contact surfaces 29, as has already been described above. For depositing the respective row of profiled rods, the transfer arms 23 are re-adjusted in the direction of the feed table 8 and, in doing so, are deposited on the already available partial stack through the holding-back action of the transfer device 10 from the transfer arm(s) 23.

It is shown in FIG. 21 that the stop element(s) 28 are swiveled away or adjusted away, for instance, from the area of the stacking shaft 11. The complete stack of profiled rods 2, seen in cross-section, is supported at the first stacking shaft wall 12, the stacking shaft bottom 15 as well as the second stacking shaft wall 13. In this position or in the position of being arranged to one another of the individual profiled rods 2, the formation of a bundle can be done e.g. by strapping several times in direction of the longitudinal extension of the stack or the bundle.

During the step-wise downward movement of the stacking table 9 at the base frame 7, the stacking aids 26 are adjusted upward by a corresponding measure with respect to the stacking shaft bottom 15, in order thus to create a support for the respective row 27 to 27d of the profiled rods to be taken in. However, it can also prove to be advantageous, if the profiled rods row with the highest number of profiled rods 2 is deposited in the stacking shaft 11—in the given design example, the profiled rods row 27b—maximum a last displacement is carried out with respect to the stacking table 9. This can also be seen in the representation given in FIG. 13. After depositing both the last two profiled rod rows here, namely the profiled rod rows 27c and 27d, no further displacement of the stacking aids 26 is to be done with respect to the stacking table 29, since no deposition is also done any further because of the reducing number of profiled rods 2.

The design examples show possible design variants of the stacking installation 1, and it is noted at this point that the invention is not restricted to the especially shown design variants of the same, but instead rather various combinations of the individual design variants are possible interchangeably and these possible variants can be developed using the skill of the expert working in this area based on the teachings of technical practice through the objective invention.

Furthermore, individual features or feature combinations of the different shown and described embodiments can represent independent, inventive solutions or solutions as per the invention.

The task that forms the basis of the independent, inventive solutions can be taken from the description.

Mainly the individual designs shown in the FIG. 1, 2 to 8, 9, 10, 11 to 21 can become the object of the solutions that are independent, inventive, or as per the invention. The tasks and solutions in this context as per the invention can be taken from the detailed descriptions of these figures.

As a matter of form, it must be pointed out that the structure of the stacking installation 1 or its components have sometimes been shown as not to scale and/or magnified and/or reduced in size for a better understanding.

LISTING OF REFERENCE SYMBOLS

1 Stacking installation
2 Profiled rod
3 first row of profiled rods
4 further rows of profiled rods
5 Longitudinal edge
6 Side surface
7 Base frame
8 Feed table
9 Stacking table
10 transfer device
11 Stacking shaft
12 first stacking shaft wall
13 second stacking shaft wall
14 Width
15 Stacking shaft bottom
16 Stayer
17 first transfer arm
18 Support area
19 Support level
20 first end
21 Guide area
22 Lower side
23 second transfer arm
24 third row of profiled rods
25 Side boundary surface
26 Stacking aids
27 Profiled rod row
28 Stop element
29 Contact area

The invention claimed is:

1. A method for an oriented deposition of hexagonal profiled rods (2), in which the cross-section of the individual profiled rods (2) of a first row of profiled rods (3) are arranged side by side are deposited with their longitudinal edges (5) pointing downward in the direction of a stacking table (9) of a stacking installation (1), whereby the method includes following steps:

providing at least an initial number of n-profiled rods (2) on a feed table (8) of the stacking installation (1), and placing the profiled rods (2) side by side as well as resting on one of their side areas (6) on the feed table (8), forming a stacking shaft (11) at the stacking table (9) of the stacking installation (1) subsequently at the feed table (8), whereby the stacking shaft (11) is formed with a width (14) between first and second stacking shaft walls (12, 13), the width (14) which is formed at least in a product value of a cross-section dimension between the side areas (6) of the profiled rods (2) aligned as running parallel to one another and the initial number "n" of the profiled rods (2), adjusting several first transfer arms (17) starting from the feed table (8) so that first ends (20) of the first transfer arms (17) protrude above the stacking shaft (11) on the side facing away from the feed table (8), transferring the initial number of n-profiled rods (2) in vertical direction with respect to their longitudinal extensions by means of a transfer device (10) on the first transfer arms (17) present above the stacking table (9), placing the initial number of n-profiled rods (2) on support areas (18) arranged horizontally on the transfer arms (17) so that the first profiled rod (2) with its longitudinal edge (5) in the direction of transfer is brought up against at least at the first stacking shaft wall (12) arranged at a distance from the feed table (8), adjacently holding the initial number of n-profiled rods (2) at their respective longitudinal edges (5) facing each other by means of the transfer device (10), re-adjusting the first transfer arms (17) in direction to the feed table (8), whereby the first end areas of the first transfer arms (17) each adjoining the horizontally aligned support areas (18) point towards the first end (20) of sloping aligned guide surface (21), and during the re-adjusting movement of the first transfer arms (17) the first profiled rod (2) is brought from its position at the horizontally aligned support surfaces (18) in the area of the sloping aligned guide surfaces (21), in doing so, swiveling the first profiled rod (2) along its longitudinal axis so that it lies with one of its side surfaces (6) at the first stacking shaft wall (12) and with one of its other side surfaces (6) at the sloping aligned guide surfaces (21) of the first transfer arms (17), guided lowering, of the first profiled rod (2) with one of its side surfaces (6) at the first stacking shaft wall (12) as well as with one of its other side surfaces (6) at the guide surfaces (21) until it is deposited directly with its longitudinal edge (5) at a stacking shaft bottom (15) of the stacking shaft (11), consecutively rotating the further profiled rods (2) on their longitudinal axis for building the first profiled rod row (3) so that the further profiled rods (2) are placed respectively with their side surfaces (6) at the sloping aligned guide surfaces (21) of the first transfer arms (17), guided lowering of the further profiled rods (2) until their direct contact with their respective longitudinal edges (5) at the stacking shaft bottom (15) of the stacking shaft (11) and, in doing so, completing the formation of the first profiled rod row (3), whereby both the outermost profiled rods (2) of the first profiled rod row (3) are supported respectively with their side surfaces (6) resting at both the stacking shaft walls (12, 13) of the stacking shaft (11) and form the profiled rod row (3) adjoining each other at their side surfaces (6).

2. The method according to claim 1, wherein the first transfer arms (17) are adjusted protruding over the stacking shaft (11) so far from the feed table (8) that the horizontally arranged support areas (18) reach until the first stacking shaft wall (12) and the sloping aligned guide surfaces (21) protrude over the first stacking shaft wall (12).

3. The method according to claim 1, wherein the initial number of n profiled rods (2) are held adjoining each other by the transfer device (10) during the consecutive lowering movement on the stacking shaft bottom (15).

4. The method according to claim 1, wherein the second profiled rod (2) of the first profiled rod row (3) immediately near to the first profiled rod (2) is guided and lowered with its side surface (6) facing the first profiled rod (2) at the side surface (6) of the first profiled rod (2) facing it.

5. The method according to claim 1, wherein the further profiled rods (2) immediately adjacent to the first profiled rod (2) of the first profiled rod row (3) are lowered with their side surfaces facing (6) facing one another adjoining guided until they come to rest at the stacking shaft bottom (15).

6. The method according to claim 1, wherein during the lowering movement of the individual profiled rods (2) of the first profiled rod row (3) the transfer device (10) adjustment is done gradually for so long in the direction of the first stacking shaft wall (12), until a gap between the first stacking shaft wall (12) and the transfer device (10) arises that corresponds to the width (14) of the stacking shaft (11).

7. The method according to claim 1, wherein the width (14) of the stacking shaft (11) is determined depending upon the respective cross-section measurement of the profiled rod (2) as well as the initial number of n profiled rods (2) and is subsequently set automatically.

8. The method according to claim 1, wherein the first and the second stacking shaft wall (12, 13) are arranged parallel to each other as well as particularly in vertical alignment.

9. The method according to claim 1, wherein the stacking shaft bottom (15) is aligned flat and particularly horizontal.

10. The method according to claim 1, wherein during the lowering movement of the individual profiled rods (2) of the first profiled rod row (3) an angle of 60° is enclosed between the first stacking shaft wall (12) and the guide surface (21) at the first transfer arm (17).

11. The method according to claim 1, wherein after building the first row of profiled rods (3) the stacking table (9) is lowered for the intake of one more row of profiled rods (4, 24).

12. The method according to claim 11, wherein at the feed table (8) at least a further number of m profiled rods (2) is provided side by side for building the further row of profiled rods (4) as well as on a row lying on their side surfaces (6).

13. The method according to claim 11, wherein several second transfer arms (23) starting from the feed table (8) are adjusted with their ends at least until the stacking shaft wall (12) of the stacking shaft (11) and subsequently the further number of m profiled rods (2) are displaced from the feed table (8) in vertical direction to their longitudinal extension by means of the transfer device (10) on the second transfer arm (23) and further the further number of m profiled rods (2) is held adjoining to one another by the transfer device (10) respectively at their longitudinal edges (5) facing one another.

14. The method according to claim 11, wherein the second transfer arm (23) is re-adjusted in the direction of the feed table (8), in doing so, the further profiled rod row (4) is held by the transfer device (10) positioned relatively to the feed table (8) and further the further number of m profiled rods (2) is deposited on the first profiled rod row (3).

\* \* \* \* \*

UNITED STATES PATENT AND TRADEMARK OFFICE
CERTIFICATE OF CORRECTION

| | | |
|---|---|---|
| PATENT NO. | : 9,850,078 B2 | |
| APPLICATION NO. | : 15/115957 | |
| DATED | : December 26, 2017 | |
| INVENTOR(S) | : Vielhaber | |

It is certified that error appears in the above-identified patent and that said Letters Patent is hereby corrected as shown below:

In the Claims

In Column 18, Line 29, (Line 54 of Claim 1) after "lowering" please delete: ",".

Signed and Sealed this
Twenty-second Day of May, 2018

Andrei Iancu
*Director of the United States Patent and Trademark Office*